United States Patent
Kang et al.

(10) Patent No.: US 12,014,661 B2
(45) Date of Patent: Jun. 18, 2024

(54) ELECTRONIC DEVICE INCLUDING DISPLAY AND METHOD FOR COMPENSATING FOR DISPLAY BURN-IN

(71) Applicant: Samsung Electronics Co., Ltd., Suwon-si (KR)

(72) Inventors: Jooyoung Kang, Suwon-si (KR); Myunghoon Kwak, Suwon-si (KR); Hanyuool Kim, Suwon-si (KR); Jungchul An, Suwon-si (KR); Kwangtai Kim, Suwon-si (KR); Donghyun Yeom, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/163,616

(22) Filed: Feb. 2, 2023

(65) Prior Publication Data

US 2023/0177990 A1  Jun. 8, 2023

Related U.S. Application Data

(63) Continuation of application No. 17/319,453, filed on May 13, 2021, now Pat. No. 11,574,570, which is a
(Continued)

(30) Foreign Application Priority Data

Jul. 31, 2020 (KR) .......................... 10-2020-0096140

(51) Int. Cl.
*G09G 5/373* (2006.01)
*G06F 1/16* (2006.01)
(Continued)

(52) U.S. Cl.
CPC ........... *G09G 3/035* (2020.08); *G06F 1/1652* (2013.01); *G06F 1/1677* (2013.01); *G09G 5/10* (2013.01);
(Continued)

(58) Field of Classification Search
CPC ............. G09G 3/035; G09G 2320/046; G09G 2340/0442; G09G 2340/0407; G09G 5/34;
(Continued)

(56) References Cited

U.S. PATENT DOCUMENTS 11,106,245 B2 * 8/2021 Shim .................... G06F 3/0414
2005/0062680 A1  3/2005 Lee et al.
(Continued)

FOREIGN PATENT DOCUMENTS

CN  111179824 A   5/2020
KR  10-2008-0018162 A  2/2008
(Continued)

OTHER PUBLICATIONS

Korean Decision to Grant with English translation dated May 6, 2021; Korean Appln. No. 10-2020-0096140.
(Continued)

*Primary Examiner* — Xuemei Zheng
(74) *Attorney, Agent, or Firm* — Jefferson IP Law, LLP

(57) ABSTRACT

An electronic device is provided. The electronic device includes a display including a plurality of display pixels, a memory, and at least one processor, wherein the at least one processor may be configured to drive the display by variably adjusting a first display region and a second display region in which visual information is to be displayed on the display, based on an operation state or a display structure state of the electronic device, calculate a difference in usage of the display between the first display region and the second
(Continued)

display region, variably determine a size of a boundary compensation region between the first display region and the second display region, based on the difference in usage, and compensate for an image of the boundary compensation region.

19 Claims, 19 Drawing Sheets

Related U.S. Application Data continuation of application No. 17/162,425, filed on Jan. 29, 2021, now Pat. No. 11,043,191.

(51) Int. Cl.
*G09G 3/00* (2006.01)
*G09G 5/10* (2006.01)
*G09G 5/14* (2006.01)

(52) U.S. Cl.
CPC .............. *G09G 5/14* (2013.01); *G09G 5/373* (2013.01); *G09G 2320/0233* (2013.01); *G09G 2320/0271* (2013.01); *G09G 2320/046* (2013.01); *G09G 2320/0626* (2013.01); *G09G 2320/0686* (2013.01); *G09G 2320/08* (2013.01)

(58) Field of Classification Search
CPC ........... G09G 5/373; G09G 2320/0233; G09G 2320/0271; G09G 2320/0686; G09G 2320/08; G09G 5/10; G09G 5/14; G06F 1/1652; G06F 1/1624; G06F 1/1681; G06F 1/1677; G06F 1/1641; G06F 2203/04102
See application file for complete search history.

(56) References Cited

U.S. PATENT DOCUMENTS

| 2009/0051830 | A1* | 2/2009 | Matsushita | ........... G06F 3/1423 361/679.05 |
| --- | --- | --- | --- | --- |
| 2010/0007656 | A1 | 1/2010 | Okamoto et al. | |
| 2013/0038639 | A1 | 2/2013 | Han et al. | |
| 2015/0022561 | A1 | 1/2015 | Ikeda et al. | |
| 2016/0086537 | A1 | 3/2016 | Shin | |
| 2016/0191097 | A1 | 6/2016 | Huh et al. | |
| 2016/0284272 | A1 | 9/2016 | Her et al. | |
| 2018/0018929 | A1* | 1/2018 | Xun | ...................... G06F 1/1626 |
| 2018/0032106 | A1* | 2/2018 | Yu | ......................... G06F 1/1652 |
| 2018/0286356 | A1 | 10/2018 | Jiang et al. | |
| 2018/0342192 | A1* | 11/2018 | Lee | ........................ G09G 3/035 |
| 2019/0164486 | A1 | 5/2019 | An | |
| 2019/0189050 | A1 | 6/2019 | Choi et al. | |
| 2019/0346954 | A1 | 11/2019 | Jung et al. | |
| 2020/0265779 | A1 | 8/2020 | In | |
| 2020/0286451 | A1 | 9/2020 | Kim et al. | |
| 2021/0012751 | A1 | 1/2021 | An et al. | |
| 2021/0201723 | A1 | 7/2021 | Choi et al. | |

FOREIGN PATENT DOCUMENTS

| KR | 10-2013-0018493 A | 2/2013 |
| --- | --- | --- |
| KR | 10-2016-0033106 A | 3/2016 |
| KR | 10-2016-0080034 A | 7/2016 |
| KR | 10-2016-0097924 A | 8/2016 |
| KR | 10-2016-0114246 A | 10/2016 |
| KR | 10-2018-0130071 A | 12/2018 |
| KR | 10-2019-0074548 A | 6/2019 |
| KR | 10-2019-0110318 A | 9/2019 |
| KR | 10-2019-0128843 A | 11/2019 |
| KR | 10-2020-0012507 A | 2/2020 |
| KR | 10-2020-0042680 A | 4/2020 |
| KR | 10-2020-0102032 A | 8/2020 |
| KR | 10-2020-0108135 A | 9/2020 |
| KR | 10-2021-0085200 A | 7/2021 |

OTHER PUBLICATIONS

International Search Report dated May 27, 2021, issued in International Application No. PCT/KR2021/001429.

Extended European Search Report dated Oct. 27, 2023, issued in European Patent Application No. 21849089.4.

* cited by examiner

ELECTRONIC DEVICE INCLUDING DISPLAY AND METHOD FOR COMPENSATING FOR DISPLAY BURN-IN

CROSS-REFERENCE TO RELATED APPLICATION(S)

This application is a continuation application of prior application Ser. No. 17/319,453, filed on May 13, 2021, which has issued as U.S. Pat. No. 11,574,570 on Feb. 7, 2023, which is a continuation application of prior application Ser. No. 17/162,425, filed on Jan. 29, 2021, which issued as U.S. Pat. No. 11,043,191 on Jun. 22, 2021, which is based on and claims priority under 35 U.S.C. § 119(a) of a Korean patent application number 10-2020-0096140, filed on Jul. 31, 2020, in the Korean Intellectual Property Office, the disclosure of which is incorporated by reference herein in its entirety.

BACKGROUND

1. Field

The disclosure relates to an electronic device including a display and a method for compensating for display burn-in.

2. Description of Related Art

An electronic device may include a display for providing visual information to a user. The display included in an electronic device may be a display having an element that emits light by itself according to supply of current, such as an organic light-emitting diode (OLED) or a plasma display panel (PDP).

In the self-luminous display, a burn-in phenomenon may occur in pixels due to driving characteristics of the display. The burn-in may be a phenomenon in which afterimages do not disappear and remain on the screen due to aging of display pixels according to the usage thereof. As described above, if an electronic device is used for a long time, it may lead to uneven display of an image or a difference in quality thereof due to burn-in of the pixels.

Recently, electronic devices (e.g., foldable devices, rollable devices, slidable devices, and multi-window devices) in which the area for displaying visual information varies using a flexible display or that are implemented as a multi-window have been introduced.

However, a difference in usage of a display may be caused due to a change in the used region of the display, for example, driving/non-driving of respective regions. If the difference in usage occurs between display regions, burn-in may differ between the regions, which brings about a phenomenon in which the boundary between display regions becomes distinct (e.g., boundary visibility). The boundary visibility may cause non-uniformity in display of an image.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below. Accordingly, an aspect of the disclosure is to provide an electronic device for compensating for an image and display driving in order to minimize or reduce a difference in display burn-in due to the difference in usage thereof, and a method for compensating for burn-in of a display.

Additional aspects will be set forth in part in the description which follows and, in part, will be apparent from the description, or may be learned by practice of the presented embodiments.

In accordance with an aspect of the disclosure, an electronic device is provided. The electronic device includes a display including a plurality of display pixels, a memory, and at least one processor, wherein the at least one processor may be configured to drive the display by variably adjusting a first display region and a second display region in which visual information is to be displayed on the display, based on an operation state or a display structure state of the electronic device, calculate a difference in usage of the display between the first display region and the second display region, variably determine a size of a boundary compensation region between the first display region and the second display region, based on the difference in usage, and compensate for an image of the determined boundary compensation region.

In accordance with another aspect of the disclosure, an electronic device is provided. The electronic device includes a display including a plurality of display pixels, a memory, and at least one processor, wherein the at least one processor may be configured to perform control so as to drive the display by variably adjusting a first display region and a second display region in which visual information is to be displayed on the display, based on an operation state or a display structure state of the electronic device, calculate a difference in usage of the display between the first display region and the second display region, variably determine a size of a boundary compensation region between the first display region and the second display region, based on the difference in usage, compensate for an image of the determined boundary compensation region, and compensate for display driving such that a burn-in level of a region having lower usage is equal to a burn-in level of a region having higher usage, among the first display region and the second display region.

In accordance with another aspect of the disclosure, a method of compensating for burn-in of a display in an electronic device is provided. The method includes driving the display by variably adjusting a first display region and a second display region in which visual information is to be displayed on the display, based on an operation state or a display structure state of the electronic device, calculating a difference in usage of the display between the first display region and the second display region, variably determining a size of a boundary compensation region between the first display region and the second display region, based on the difference in usage, and variably compensating for an image according to the determined size of the boundary compensation region.

In accordance with another aspect of the disclosure, in an electronic device having an extendable display or operating as a multi-window, it is possible to reduce the difference in burn-in between display pixels by reducing the boundary visibility that occurs due to a difference in usage between display regions and by accelerating display driving in the respective regions.

In accordance with another aspect of the disclosure, it is possible to provide an effect such as overall gamma correction using a compensation filter for a burn-in region of a display.

In accordance with another aspect of the disclosure, various effects that are directly or indirectly recognized through this document may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only, and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
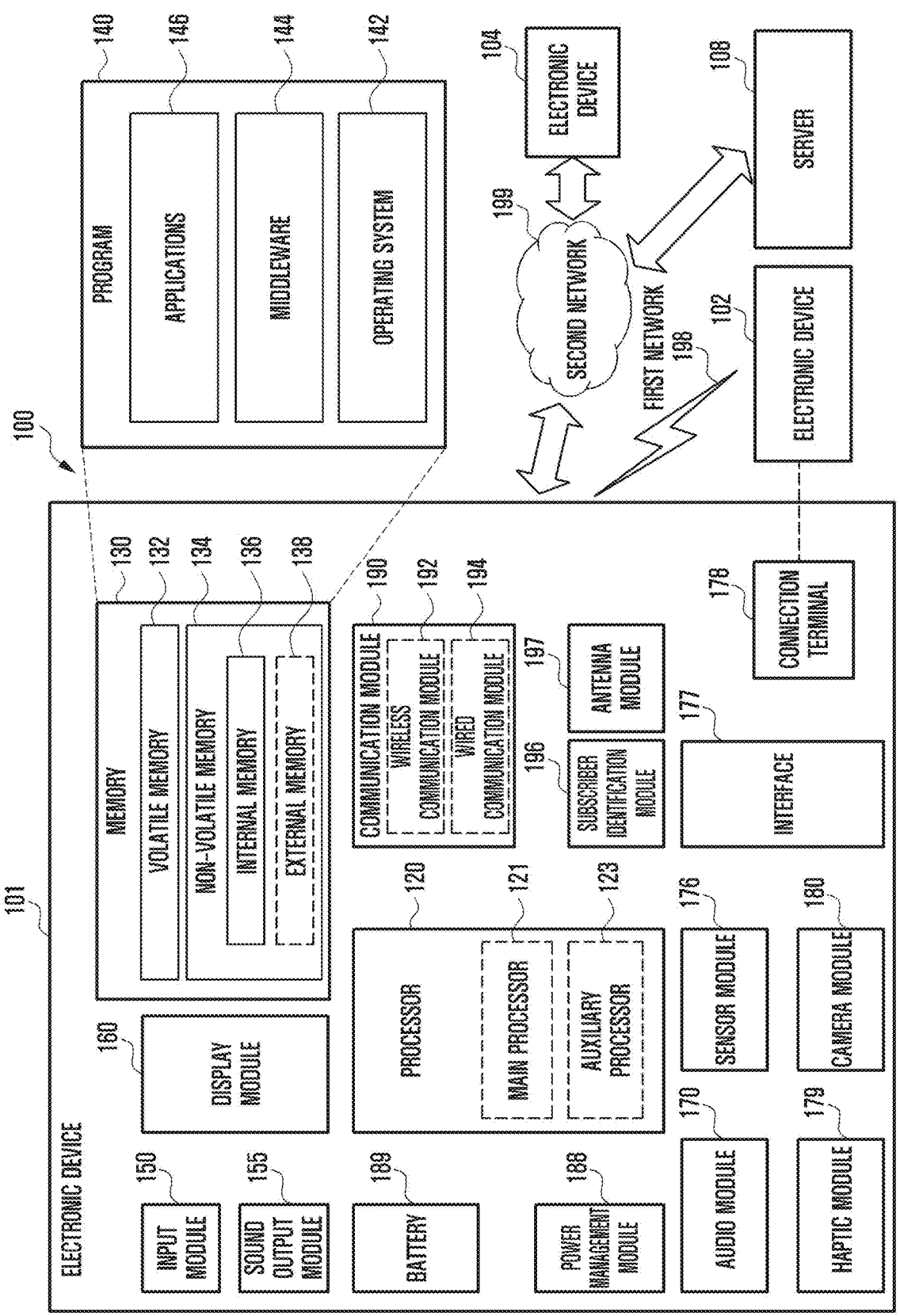
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, and/or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and/or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof, but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 and/or the non-volatile memory 134. The non-volatile memory 134 may include an internal memory 136 and/or an external memory 138.

The program 140 may be stored in the memory 130 as software, and may include, for example, an operating system (OS) 142, middleware 144, and/or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, and/or flashes.

The power management module 188 may manage power supplied to and/or used by the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, a fuel cell, or a combination thereof.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include the wireless communication module 192 (e.g., a cellular communication module, a short-range wireless communication module, or a global navigation satellite system (GNSS) communication module) or the wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a millimeter (mm) Wave antenna module. According to an embodiment, the mmWave antenna module may include a printed circuit board, a radio frequency integrated circuit (RFIC) disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

An electronic device 101 according to various embodiments may include a display in which the size of an active region for displaying information (or an image or a graphical user interface (GUI)) is variable. The electronic device 101 may control driving/non-driving for respective display regions.

The electronic device 101 according to various embodiments may variably determine an active region in which visual information is to be displayed, based on the structure state of the display or the operation state of the electronic device 101, and may fully or partially drive the display, based on the determined active region. For example, the electronic device 101 may include a rollable electronic device, a slidable electronic device, a foldable electronic device, and a multi-window device, but is not limited thereto.

The structures of the electronic device 101 described below are only examples of an electronic device in which the area of the active region is variable, and in addition, an electronic device in which the active region for displaying visual information varies may be implemented in various ways. In this document, the term "state" may indicate the operation of an electronic device or a structural form or a shape of a display.

Figure 2A:
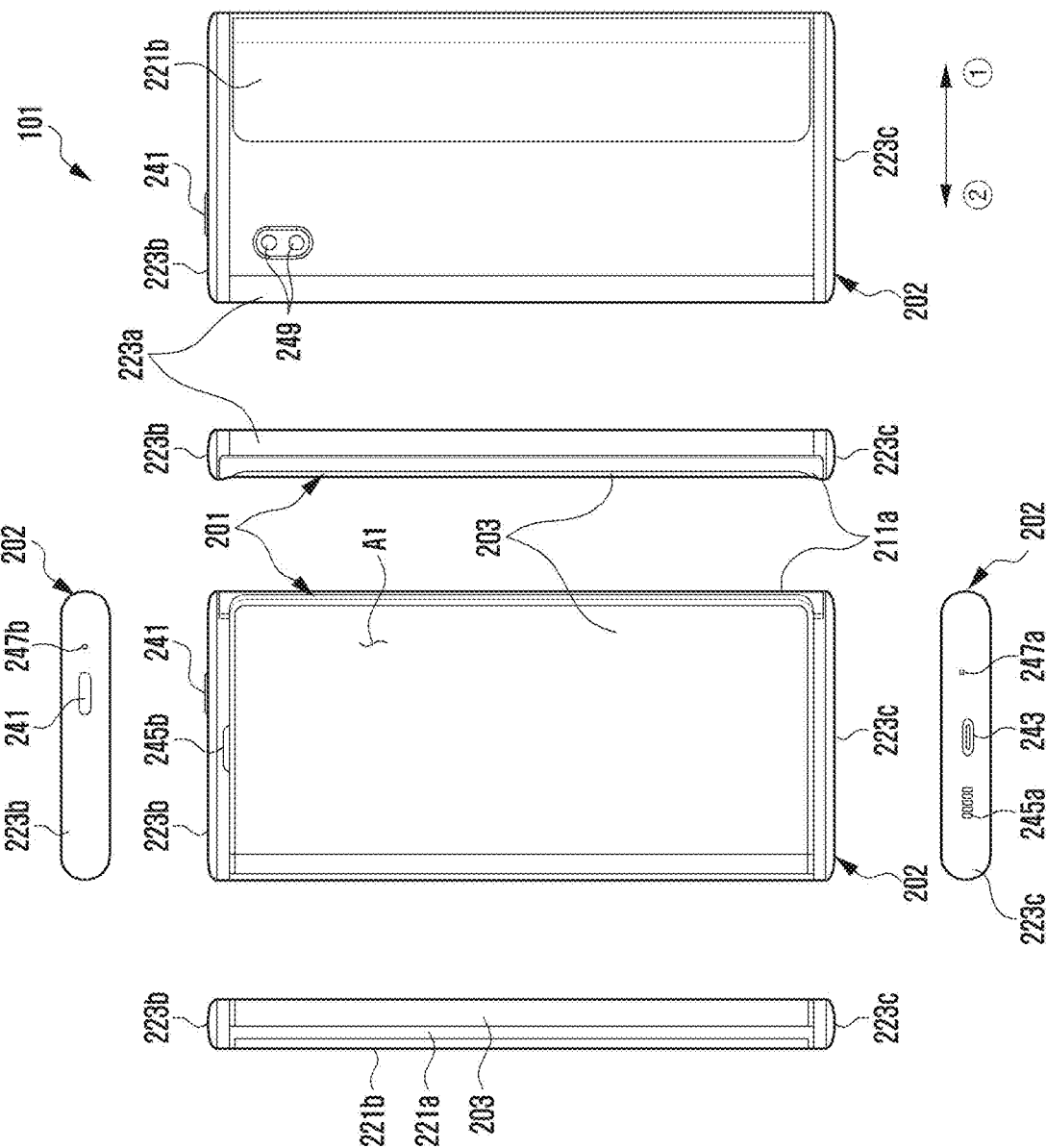
FIG. 2A is a diagram illustrating a structure of a display of an electronic device according to an embodiment of the disclosure.
Figure 2B:
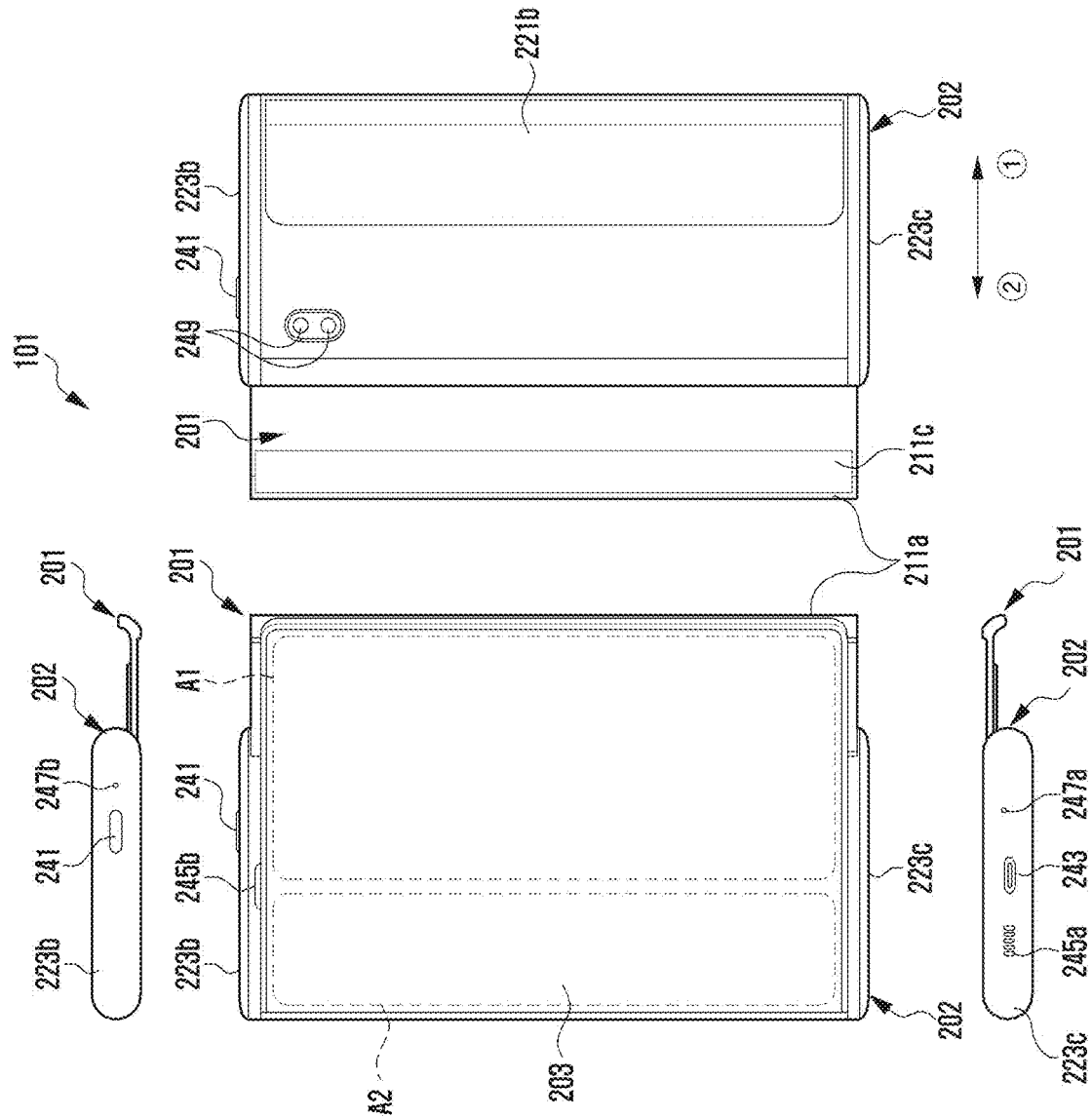
FIG. 2B is another diagram illustrating a structure of a display of an electronic device according to an embodiment of the disclosure.
Figure 2C:
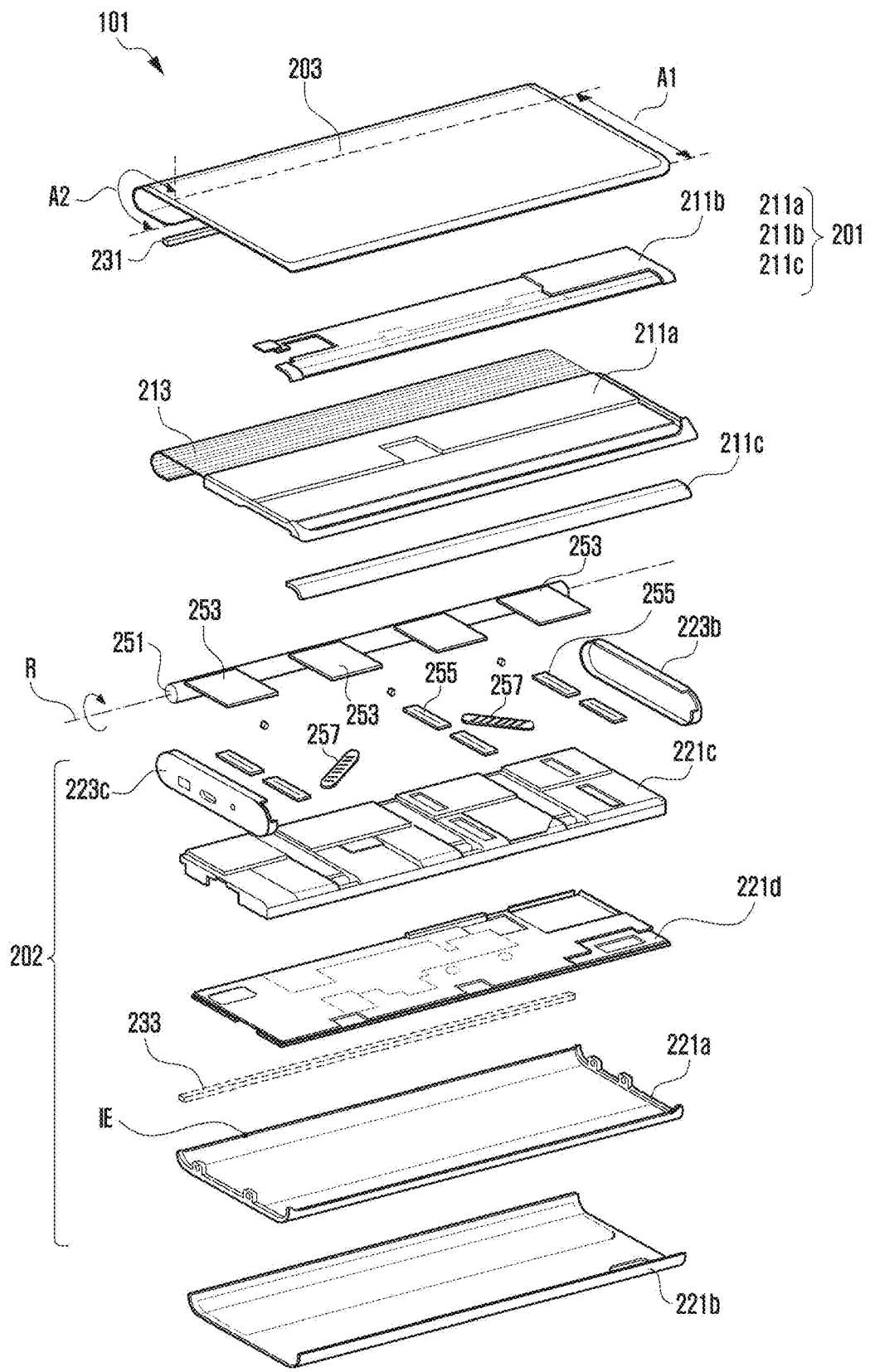
FIG. 2C is an exploded perspective view of the electronic device shown in FIGS. 2A and 2B according to an embodiment of the disclosure.

FIG. 2A is a diagram illustrating a structure of a display of an electronic device according to an embodiment of the disclosure, FIG. 2B is another diagram illustrating a structure of a display of an electronic device according to an embodiment of the disclosure, and FIG. 2C is an exploded perspective view of the electronic device shown in FIGS. 2A and 2B according to an embodiment of the disclosure.

Referring to FIGS. 2A to 2C, as an example according to various embodiments, an electronic device (e.g., the electronic device 101 in FIG. 1) may include a first structure 201, and a second structure 202 implemented to enable the reciprocating movement of the first structure 201, and a display 203 (e.g., the display module 160 in FIG. 1).

According to an embodiment, the display 203 may be a flexible display. As the first structure 201 slides on the second structure 202, the area (or width) of the display 203 exposed to the outside may be increased or reduced. For example, based on FIG. 2B, if the first structure 201 slides in a first direction (e.g., the direction ①) with respect to the second structure 202, the area of the display 203 may be increased, and if the first structure 201 slides in a second direction (e.g., the direction ②) with respect to the first structure 201, the area of the display 203 may be reduced.

According to an embodiment, the display 203 may include a first display region A1 and a second display region A2. The first display region A1 of the display 203 may be disposed in the first structure 201. The second display region A2 of the display 203 may extend from the first display region A1, and may be inserted into or accommodated by the second structure 202 (e.g., a housing) (e.g., a slide-in operation), or may be exposed to the outside of the second structure 202 (e.g., a slide-out operation) according to the sliding movement of the first structure 201.

As described below, the second display region A2 may move substantially based on a roller 251 (see FIG. 2C) mounted to the second structure 202 to be accommodated in the second structure 202 or to be exposed to the outside thereof. A portion of the second display region A2 may be deformed into a curved shape at a position corresponding to the roller 251 while the first structure 201 is sliding.

The electronic device 101 (e.g., a processor thereof) may change an active region of the display 203, which is driven based on the area of the display 203 exposed to the outside. The active region may be understood as a driving region of a display or a region in which visual information is to be displayed. For example, FIG. 2A shows the state in which the first structure 201 is closed with respect to the second structure 202, and the electronic device 101 (e.g., a processor thereof) may designate the first display region A1 as an active region in the closed state. In the closed state, the electronic device 101 may activate/drive the first display region A1 of the display 203, and may deactivate/may not drive the second display region A2. FIG. 2B shows the state in which the first structure 201 is open with respect to the second structure 202, and in the open state, the electronic device 101 (e.g., a processor thereof) may designate the first display region and the second display region as active regions.

As another example, the electronic device 101 may have an intermediate state (or a partially opened state) between the closed state and the open state. In the intermediate state, the electronic device 101 may designate only the area exposed to the outside of the second structure 202 in the total area of the display 203 as an active region. In the closed state, if there is no user input for a predetermined period of time (e.g., 30 seconds or 2 minutes), the electronic device 101 may deactivate the entire region of the display 203.

According to an embodiment, the first structure 201 may be referred to as, for example, a "first housing," a "slide part," or a "slide housing," and the second structure 202 may be referred to as, for example, a "second housing," a "main part," or a "main housing," and may accommodate various types of electric and electronic components such as a main circuit board or a battery.

According to one embodiment, the first structure 201 may include a first plate 211a (e.g., a slide plate), and a first bracket 211b and/or a second bracket 211c mounted to the first plate 211a, and may include a first surface formed to include at least a portion of the first plate 211*a* and a second surface facing in the opposite direction of the first surface. The first plate 211*a*, the first bracket 211*b*, and/or the second bracket 211*c* may be formed of a metal material and/or a non-metal (e.g., polymer) material. According to an embodiment, the first bracket 211*b* and/or the second bracket 211*c* may be integrally formed with the first plate 211*a*. The second structure 202 may include a second plate 221*a* (e.g., a rear case), a first side wall 223*a* extending from the second plate 221*a*, a second side wall 223*b* extending from the first side wall 223*a* and the second plate 221*a*, a third side wall 223*c* extending from the first side wall 223*a* and the second plate 221*a* so as to be parallel to the second side wall 223*b*, and/or a rear plate 221*b* (e.g., a rear window). In some embodiments, the second side wall 223*b* and the third side wall 223*c* may be formed substantially perpendicular to the first side wall 223*a*. According to an embodiment, the second plate 221*a*, the first side wall 223*a*, the second side wall 223*b*, and the third side wall 223*c* may be formed to have an opening at one side (e.g., a front face) so as to accommodate (or surround) at least a portion of the first structure 201.

According to various embodiments, the second side wall 223*b* or the third side wall 223*c* may be omitted. According to an embodiment, the second plate 221*a*, the first side wall 223*a*, the second side wall 223*b*, and/or the third side wall 223*c* may be made as separate structures, and may then be combined or assembled with each other. The rear plate 221*b* may be coupled so as to surround at least a portion of the second plate 221*a*. In some embodiments, the rear plate 221*b* may be formed to be substantially integral with the second plate 221*a*. According to an embodiment, the second plate 221*a* or the rear plate 221*b* may cover at least a portion of the display 203. For example, the display 203 may be at least partially accommodated in the second structure 202, and the second plate 221*a* or the rear plate 221*b* may cover a portion of the display 203, which is accommodated in the second structure 202.

According to various embodiments, the rear plate 221*b* may include a support member 221*d*, and the support member 221*d* may be disposed in a space between the second plate 221*a* and a third plate 221*c*, and may be made of a metal or polymer material in the form of a plate. The support member 221*d* may provide an electromagnetic shielding structure to the inner space of the second structure 202, or may improve mechanical rigidity of the second structure 202. In an embodiment, an articulated hinge structure 213 and/or a partial region of the display 203 (e.g., the second region A2) may be positioned between the second plate 221*a* and the support member 221*d* when they are accommodated in the second structure 202.

In various embodiments, the rear plate 221*b* may include a window region (e.g., a portion of the rear plate 221*b*) and an opaque region (e.g., another portion of the rear plate 221*b*). The window region may be formed of a transparent or translucent material. For example, the window region may be formed by at least a portion of the rear plate 221*b*, which is made of a transparent or translucent material. At least a portion of the rear plate 221*b* (e.g., an opaque region) may be formed of a polymer, coated or colored glass, ceramic, metal (e.g., aluminum, stainless steel (STS), or magnesium), or a combination of at least two thereof.

According to various embodiments, the first structure 201 may move in a first direction and a second direction (e.g., the direction ① and the direction ②) parallel to the second plate 221*a* (e.g., the rear case) and the second side wall 223*b*/third side wall 223*c* to enter the open state and the closed state with respect to the second structure 102. The first structure 201 may move so as to be placed at a first distance from the first side wall 223*a* in the closed state and at a second distance, which is greater than the first distance, from the first side wall 223*a* in the open state. In some embodiments, the first structure 201 may be positioned to surround a portion of the first side wall 223*a* in the closed state.

According to an embodiment, at least a portion of the second display region A2 of the display 203 may be visually exposed to the rear surface of the electronic device 101 through the window region of the rear plate 221*b*. For example, at least a portion of the second display region A2 may be visually exposed in the rear direction of the electronic device 101 through the window region in the closed state of the electronic device 101 (see FIG. 2A).

According to an embodiment, the electronic device 101 may include the display 203, a key input device 241 (e.g., the input module 150 in FIG. 1), a connector hole 243 (e.g., the connection terminal 178 in FIG. 1), audio modules 245*a*, 245*b*, 247*a*, and 247*b* (e.g., the sound output module 155 in FIG. 1), and/or a camera module 249 (e.g., the camera module 180 in FIG. 1). Although not shown, the electronic device 101 may further include an indicator (e.g., a light emitting diode (LED) device) or various types of sensor modules (e.g., the sensor module 176 in FIG. 1).

According to an embodiment, the camera module 249 may be disposed below at least a portion of the first display region A1 of the display 203 without being limited to the embodiment in FIG. 2A or 2B. For example, in the closed state (see FIG. 2A) or the open state (see FIG. 2B) of the electronic device 101, the position of the camera module 249 may not be visually identified (or exposed), and related functions (e.g., image capturing) using the camera module 249 may be performed. For example, when the first display region A1 is viewed from the front, the camera module 249 may be disposed to overlap at least a portion of the first display region A1 so as to obtain an image of an external subject without being exposed to the outside.

According to an embodiment, a guide member, for example, the roller 251 may be rotatably coupled to the second structure 202 (e.g., the second plate 221*a*) at a position adjacent to one edge of the second structure 202. For example, the roller 251 may be disposed adjacent to the edge of the second plate 221*a* parallel to the first side wall 223*a* (e.g., the portion indicated by the reference numeral "IE"). Although a reference numeral is not given in the drawings, another side wall may extend from the edge of the second plate 221*a* adjacent to the roller 251, and the side wall adjacent to the roller 251 may be substantially parallel to the first side wall 223*a*. As mentioned above, the sidewall of the second structure 202 adjacent to the roller 251 may be made of a material that transmits light, and a portion of the second display region A2 may be accommodated in the second structure 202, and visual information may be provided through a portion of the second structure 202.

According to an embodiment, one end of the roller 251 may be rotatably coupled to the second side wall 223*b*, and the opposite end thereof may be rotatably coupled to the third side wall 223*c*. For example, the roller 251 may be mounted to the second structure 202, and may rotate around a rotation axis R perpendicular to the sliding direction of the first structure 201 (e.g., the direction ① or the direction ②). The rotation axis R may be disposed substantially parallel to the first side wall 223*a*, and may be positioned away from the first side wall 223*a*, for example, at one edge of the second plate 221*a*. In an embodiment, the gap formed between the outer surface of the roller 251 and the inner surface of the edge of the second plate 221a may form an inlet through which the articulated hinge structure 213 or the display 203 enters the inside of the second structure 202.

According to an embodiment, the articulated hinge structure 213 may include a form in which a plurality of bars extending in substantially the same direction as the rotation axis R of the roller 251 is arranged. The articulated hinge structure 213 may be bent at portions having a relatively thin thickness between a plurality of bars. In an embodiment, the articulated hinge structure 213 may be replaced with another name such as a "flexible track" or a "hinge rail."

According to an embodiment, a support sheet 253 may be made of a material having flexibility and elasticity of a certain degree, for example, a material including an elastic body such as silicone or rubber, and may be mounted or attached to the roller 251 to then be selectively wound around the roller 251 as the roller 251 rotates. The number, sizes, and/or shapes of the support sheets 253 are not limited to the illustrated example, and may be variously modified. In other embodiments, the support sheet 253 may be referred to as a "support belt," an "auxiliary belt," a "support film," or an "auxiliary film."

According to an embodiment, the electronic device 101 may further include one or more elastic members 231 and 233 made of a low-density elastic body, such as a sponge, or a brush, guide rails 255, and/or actuating members 257. The guide rails 255 may be mounted to the second structure 202, for example, the third plate 221c to guide the sliding movement of the first structure 201 (e.g., the first plate 211a or the slide plate). The actuating members 257 may include a spring or a spring module that provides an elastic force in a direction in which both ends thereof move away from each other. One end of the actuating member 257 may be rotatably supported by the second structure 202, and the opposite end thereof may be rotatably supported by the first structure 201.

Figure 3:
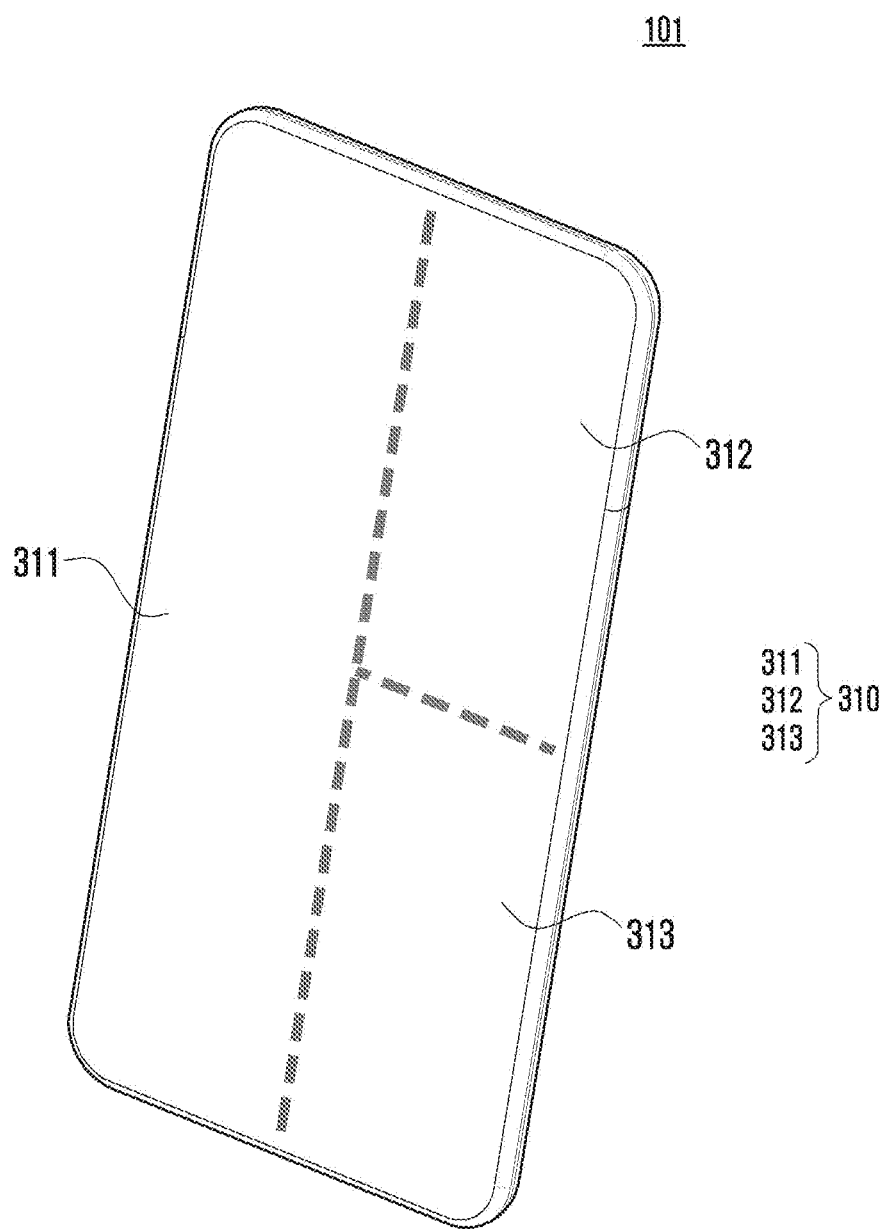
FIG. 3 illustrates a configuration of an electronic device according to an embodiment of the disclosure.

FIG. 3 illustrates a configuration of an electronic device according to an embodiment of the disclosure.

Referring to FIG. 3, as an example according to various embodiments, an electronic device (e.g., the electronic device 101 in FIG. 1) may be a multi-window device capable of selectively or partially driving an active region in which visual information (e.g., text, images, or icons) is displayed on a display 310 (e.g., the display 203 in FIGS. 2A to 2C). The multi-window device may be a device having multiple windows obtained by dividing a single display 310, but is not limited thereto, and may be implemented in various ways. As another example, the multi-window device may be implemented as a foldable device or an electronic device including two displays.

According to an embodiment, the display 310 may include a first window region 311, a second window region 312, and a third window region 313. The display 310 may designate at least one of the first window region 311, the second window region 312, or the third window region 313 as an active region according to functions of the electronic device 101 and/or application execution information.

The electronic device 101 may independently operate the respective window regions. The electronic device 101 may selectively or partially drive the display 310 only in the window region determined to be an active region, and may not drive the window region determined to be an inactive region. Although not shown in the drawing, the electronic device 101 may separate the respective window regions, and may display at least one window frame capable of adjusting the size of the window region on the display 310.

For example, in the case where the electronic device 101 may designate the first window region 311 as an active region, the electronic device 101 may display visual information only in the first window region 311. As another example, if the electronic device 101 determines the second window region 312 and the third window region 313 to be active regions, the electronic device 101 may display visual information only in the second window region 312 and the third window region 313.

Hereinafter, the electronic device 101 according to various embodiments may perform independently, in parallel, or simultaneously an operation of compensating for image data to be displayed on the display and/or an operation of compensating for the driving of each display region, based on the difference in usage between display regions, when various applications or functions installed in the electronic device 101 are executed.

Figure 4:
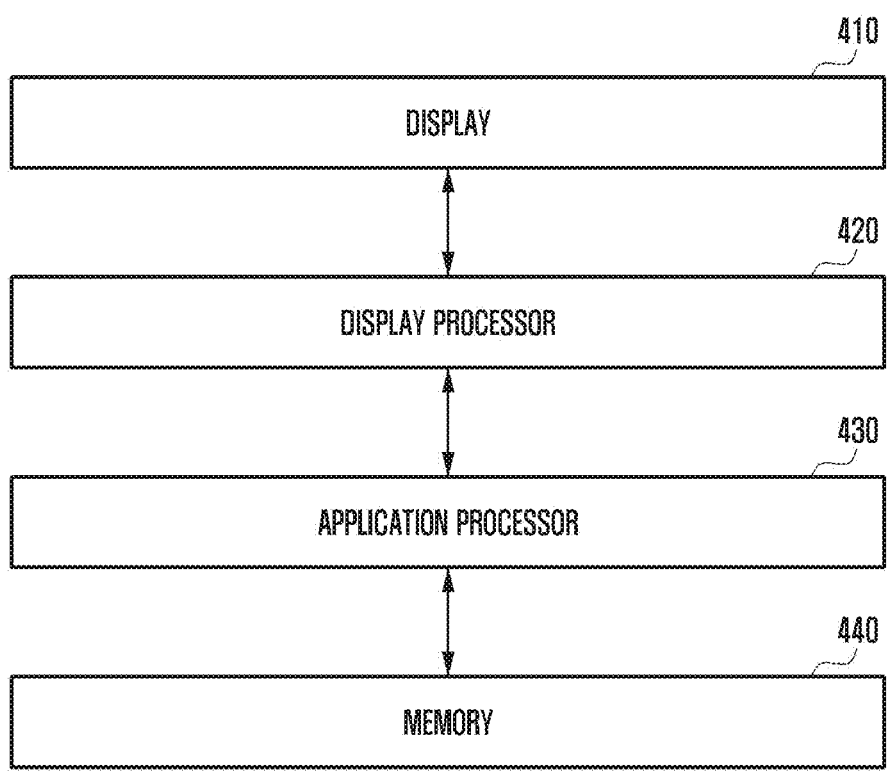
FIG. 4 is a block diagram of an electronic device according to an embodiment of the disclosure.

FIG. 4 is a block diagram of an electronic device according to an embodiment of the disclosure.

Referring to FIG. 4, an electronic device (e.g., the electronic device 101 in FIG. 1, the electronic device 101 in FIGS. 2A to 2C, or the electronic device 101 in FIG. 3) according to various embodiments may include a display 410, a display processor 420 (e.g., a display drive integrated circuit (DDI)), an application processor 430, and a memory 440. Even if at least some of the illustrated configurations are omitted or replaced, various embodiments are able to be implemented. In addition to the illustrated configurations, the electronic device 101 may further include at least some of the configurations and/or functions of the electronic device 101 shown in FIG. 1.

According to an embodiment, the display 410 may display an image according to a control signal of the display processor 420. For example, the display 410 may be any one of displays using an element that emits light by itself according to the supply of current, such as an organic light-emitting diode (OLED) or a plasma display panel (PDP), but is not limited thereto. The display 410 may include at least some of the configurations and/or functions of the display module 160 in FIG. 1.

According to an embodiment, the display 410 may include a plurality of pixels, and each pixel may include an R subpixel that outputs red color, a G subpixel that outputs green color, and a B subpixel that outputs blue color, and the intended color may be implemented by adjusting the brightness of each subpixel.

According to an embodiment, the display processor 420 may include a DDI for controlling the display 410. The display processor 420 may receive image data and/or image information (or visual information) including a control signal for controlling the image data from the application processor 430. For example, the display processor 420 may be electrically or functionally coupled to the application processor 430 through an interface (e.g., a MIPI), and may receive an image from the application processor 430 through an interface.

According to an embodiment, the display processor 420 may include a plurality of display processors 420. For example, the electronic device 101 may include display processors 420 that perform independent control for respective display regions (e.g., a first display region and a second display region). For example, the electronic device 101 may include a first display processor that controls a first display region (e.g., the first display region A1 in FIGS. 2A to 2C) and a second display processor that controls a second display region (e.g., the second display region A2 in FIGS.

2A to 2C). In addition, independent signal processing (e.g., a gate driver and/or a source driver) may be performed for each display processor.

According to an embodiment, the display processor 420 may include at least one memory (e.g., a random-access memory (RAM)) (not shown) (e.g., a graphic RAM) therein. The display processor 420 may store at least some of the received image information in the memory, for example, in units of frames.

According to an embodiment, for example, the display processor 420 may perform control so as to perform pre-processing or post-processing (e.g., adjusting the resolution, brightness, or size) of at least some of the image data, based on the characteristics of an image or the characteristics of the display 410, using an image processing module (not shown). According to an embodiment, the image processing module (not shown) may perform image processing on the image data obtained from the application processor 430 or the image data stored in the memory 440. For example, image processing may include image synthesis or image compensation (e.g., reduction of noise, adjustment of resolution, adjustment of brightness, blurring, sharpening, or softening).

According to an embodiment, the display processor 420 may convert the pre-processed or post-processed image data into voltage values or current values capable of driving the pixels, based on the properties of the pixels (e.g., arrangement of pixels (red, green, blue (RGB) stripes or PenTile) or the size of each subpixel). For example, the pixels may be driven based on the voltage values or current values, so that visual information (e.g., text, images, or icons) corresponding to the image data is displayed in the active region of the display 410.

According to an embodiment, the application processor 430 may be configured to perform an operation or data processing related to control and/or communication of respective elements of the electronic device 101, and may include at least some of the configurations and/or the functions of the processor 120 in FIG. 1. The application processor 430 may be electrically connected to the respective elements of the electronic device 101 (e.g., the display processor 420, the memory 440, and the like).

According to an embodiment, the application processor 430 may accumulate and measure the usage of each region of the display 410. For example, the application processor 430 may measure the usage of the first display region A1 and the second display region A2, based on the display structure state shown in FIGS. 2A to 2C, and may calculate a difference in usage. As another example, the application processor 430 may measure the usage for each window region in the multi-window device, as shown in FIG. 3, and may calculate a difference in usage.

According to an embodiment, the application processor 430 may variably determine a boundary compensation region, based on the difference in usage between display regions, and may perform at least one of an operation of compensating for image data on the boundary compensation region or an operation of compensating for display driving. For example, the application processor 430 may variably change the size of the boundary compensation region and/or a filter compensation value depending on the difference in usage between the display regions, thereby compensating for the image in the boundary compensation region. The boundary compensation region, intended to compensate for pixel burn-in according to the difference in usage between the display regions, may be at least a portion of the display, and may vary depending on a compensation value.

The application processor 430 may compensate for driving of a display region having low usage (e.g., the second display region A2) such that the usage level thereof matches the usage level of a display region having high usage (e.g., the first display region A1).

According to some embodiments, the application processor 430 may identify burn-in information on the display pixels, as well as the difference in usage between display regions, and may compensate for an image or display driving, based on the burn-in information.

According to an embodiment, the display processor 420 and the application processor 430 may be configured as a single processor. For example, the display processor 420 may be configured as at least a portion of the application processor 430 (e.g., the processor 120 in FIG. 1), and functions and/or operations of the display processor 420 and the application processor 430 may be complementarily performed.

According to an embodiment, the memory 440 may include a volatile memory (e.g., the volatile memory 132 in FIG. 1) and/or a non-volatile memory (e.g., the non-volatile memory 134 in FIG. 1), and may be electrically connected to the application processor 430. The memory 440 may store various instructions capable of being executed by the application processor 430 or the display processor 420. In some embodiments, the display processor (e.g., a DDI) may include a side memory, and the side memory may also store instructions. These instructions may include control commands, such as arithmetic and logical operations, data transfer, input/output, and the like, which are capable of being recognized by the processor. In addition, the memory 440 may store at least some of the programs 140 in FIG. 1.

An electronic device 101 according to various embodiments may include a display (e.g., the display module 160 in FIG. 1, the display 203 in FIGS. 2A to 2C, the display 310 in FIG. 3, or the display 410 in FIG. 4) including a plurality of display pixels, a memory (e.g., the memory in FIG. 1 or the memory 440 in FIG. 4), and a processor (e.g., the processor 120 in FIG. 1, or the display processor 420 and the application processor 430 in FIG. 4), and the processor may be configured to drive the display by variably adjusting a first display region and a second display region in which visual information is to be displayed on the display, based on the operation state or the display structure state of the electronic device, calculate a difference in usage of the display between the first display region and the second display region, variably determine the size of a boundary compensation region between the first display region and the second display region, based on the difference in usage, and compensate for an image for the determined boundary compensation region.

According to an embodiment, the electronic device 101 may further include a first structure (e.g., the first structure 201 in FIGS. 2A to 2C) and a second structure (e.g., the second structure 202 in FIGS. 2A to 2C) disposed to enable reciprocating movement of the first structure, wherein the display is a flexible display, and the first display region may be disposed in the first structure, wherein the second display region may extend from the second display region, and may be configured to be at least partially accommodated in the second structure or exposed to the outside of the second structure according to the reciprocating movement of the first structure, and wherein the processor may perform control so as to drive the display of the second display region, based on the state in which the second display region is exposed to the outside of the second structure, and so as not to drive the display of the second display region, based on the state in which the second display region is accommodated in the second structure.

According to an embodiment, the processor may perform control such that the size of the boundary compensation region increases in proportion to the difference in usage between the first display region and the second display region.

According to an embodiment, the processor may perform control so as to compensate for the image of the boundary compensation region by applying a gradation compensation filter in which a compensation value of the boundary compensation region varies depending on the difference in usage.

According to an embodiment, the processor may perform control so as to compensate for an image displayed in the first display region and an image displayed in the second display region independently of the compensation for the image of the boundary compensation region or in addition thereto.

According to an embodiment, the processor may perform control so as to display at least one window frame for separating the first display region and the second display region or separating app execution window regions on the display in a multi-window mode or a multi-application environment, and may perform control so as to variably change the size (e.g., length and/or width) of at least one window frame located in the boundary compensation region in proportion to the difference in usage between the first display region and the second display region.

The electronic device 101 according to various embodiments may include a display (e.g., the display module 160 in FIG. 1, the display 203 in FIGS. 2A to 2C, the display 310 in FIG. 3, or the display 410 in FIG. 4) including a plurality of display pixels, a memory (e.g., the memory 130 in FIG. 1 or the memory 440 in FIG. 4), and a processor (e.g., the processor 120 in FIG. 1, or the display processor 420 and the application processor 430 in FIG. 4), and the processor may perform control so as to drive the display by variably adjusting a first display region and a second display region in which visual information is to be displayed on the display, based on an operation state or a display structure state of the electronic device, calculate a difference in usage of the display between the first display region and the second display region, variably determine the size of a boundary compensation region between the first display region and the second display region, based on the difference in usage, compensate for an image for the determined boundary compensation region, and compensate for display driving of a region having lower usage such that a burn-in level of a region having lower usage is equal to a burn-in level of a region having higher usage, among the first display region and the second display region.

According to an embodiment, the electronic device 101 may further include a first structure (e.g., the first structure 201 in FIGS. 2A to 2C) and a second structure (e.g., the second structure 202 in FIGS. 2A to 2C) disposed to enable reciprocating movement of the first structure, wherein the display is a flexible display, and the first display region may be disposed in the first structure, wherein the second display region may extend from the first display region and may be configured to be at least partially accommodated in the second structure or exposed to the outside of the second structure according to the reciprocating movement of the first structure, and wherein the processor may perform control so as to drive the display of the second display region, based on the state in which the second display region is exposed to the outside of the second structure, and so as not to drive the display of the second display region, based on the state in which the second display region is accommodated in the second structure.

According to an embodiment, the processor may perform control so as to increase the size of the boundary compensation region in proportion to the difference in usage between the first display region and the second display region and compensate for an image for the boundary compensation region by applying a gradation compensation filter in which a compensation value of the boundary compensation region varies depending on the difference in usage.

According to an embodiment, the processor may perform control so as to compensate for an image displayed in the first display region and an image displayed in the second display region independently of the compensation for the image in the boundary compensation region or in addition thereto.

According to an embodiment, the processor may perform control so as to display at least one window frame for separating the first display region and the second display region or separating app execution window regions on the display in a multi-window mode or a multi-application environment, and may perform control so as to variably change the size of at least one window frame located in the boundary compensation region in proportion to the difference in usage between the first display region and the second display region.

According to an embodiment, the processor may determine a region having higher usage, among the first display region and the second display region, may adjust the brightness of the region having higher usage to be lower than a predetermined value, and may adjust the brightness of a region having lower usage to be higher than a predetermined value.

According to an embodiment, the processor may identify window regions dividing the display if a plurality of applications is executed, based on image data to be displayed on the display, dispose a first window region or a first application for displaying the visual information with lower brightness in a region having higher usage of the first display region and the second display region, and dispose a second window region or a second application for displaying the visual information with higher brightness in a region having lower usage thereof, thereby compensating for the display driving.

According to an embodiment, if the second display region is in an inactive state, the processor may forcibly drive the second display region, thereby compensating for the display driving such that the usage of the first display region is equal to the usage of the second display region.

According to an embodiment, the processor may perform control such that the usage of the second display region increases by applying a gradient compensation filter in which a brightness value or a usage value gradually increases in a direction toward the second display region during the forcible driving.

According to an embodiment, the processor may perform control so as to forcibly drive the second display region while charging the electronic device.

According to an embodiment, the processor may compensate for display driving in the boundary compensation region by variably changing the position of a boundary line between the first display region and the second display region.

Figure 5:
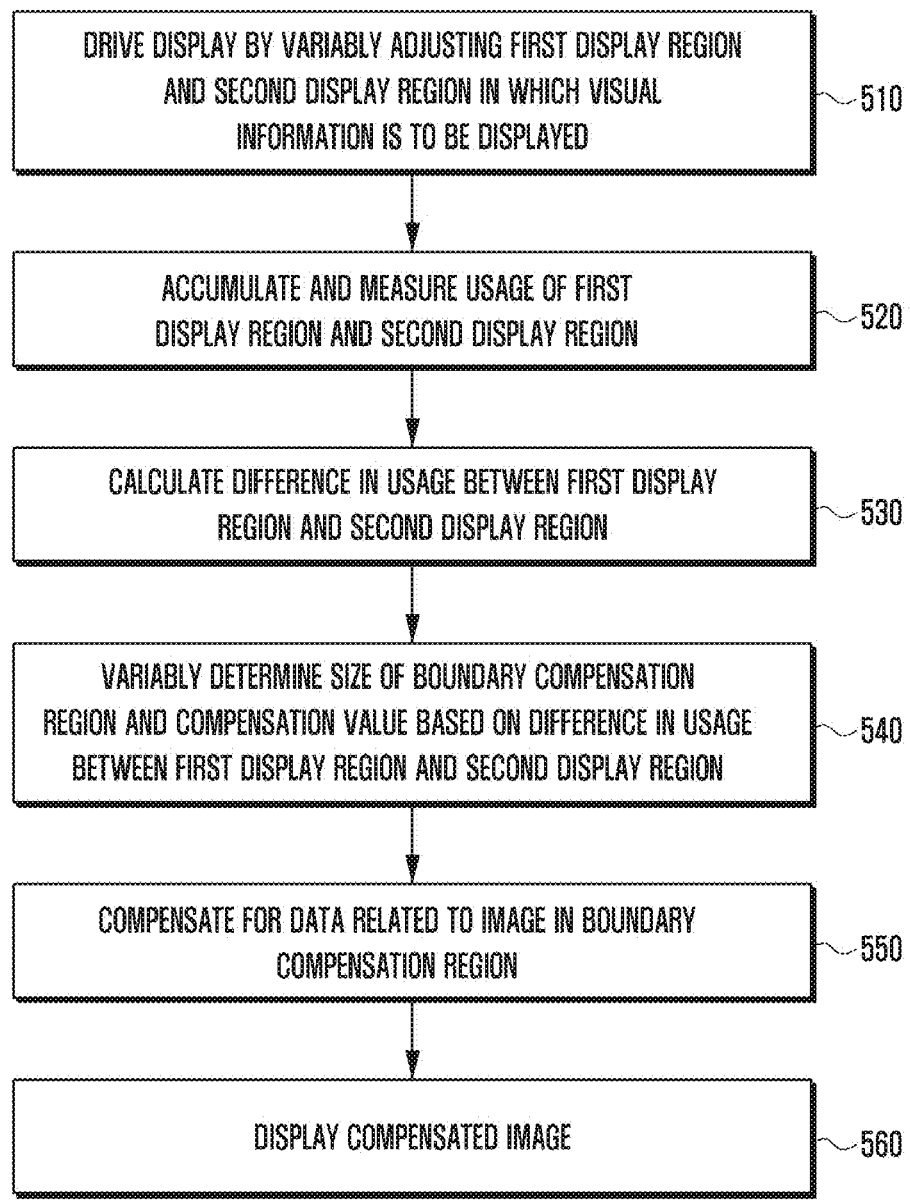
FIG. 5 illustrates a method of compensating for display burn-in of an electronic device according to an embodiment of the disclosure.

FIG. 5 illustrates a method of compensating for display burn-in of an electronic device according to an embodiment of the disclosure.

Referring to FIG. 5, in operation 510, a processor (e.g., the processor 120 in FIG. 1 or the application processor 430 in FIG. 4) of an electronic device 101 according to various embodiments may variably adjust a first display region and a second display region (or an active region) in which visual information is to be displayed, thereby driving a display (e.g., the display module 160 in FIG. 1 or the display 410 in FIG. 4).

According to an embodiment, when various applications or functions installed in the electronic device 101 are executed, the electronic device 101 may variably adjust the active region in which visual information is to be displayed according to the display structure state (e.g., a closed state, an intermediate state, or an open state). For example, if the display 203 is in a closed state as shown in FIG. 2A, the electronic device 101 may designate the first display region A1 as an active region, thereby driving the display (e.g., the display 203 in FIG. 2A), and may control the second display region A2 to not be driven. As another example, when the display 203 is in an open state as shown in FIG. 2B, the electronic device 101 may designate the first display region A1 and the second display region A2 as active regions, thereby driving the display 203.

According to some embodiments, the electronic device 101 may partially designate a portion of the second display region A2 as an active region. In the case of an intermediate state (or a partially opened state), the electronic device 101 may identify the size of the exposed region of the second display region A2, and may designate the exposed region as an active region.

According to another embodiment, in the electronic device 101, the first display region and the second display region may be replaced with window regions of a multi-window environment as shown in FIG. 3. The electronic device 101 may partially drive the display (e.g., the display 310 in FIG. 3) only in the window region determined to be an active region. For example, the electronic device 101 may divide the window regions into individual sections, and may operate the window regions independently.

According to an embodiment, the processor 120 or 430 of the electronic device 101 may perform control so as to display visual information in the active region of the display 160 or 410 using a display processor (e.g., a DDI) (the display processor 420 in FIG. 4). According to an embodiment, the display processor 420 may include a gate driver (not shown) and/or a source driver (not shown), and may provide a clock signal for the operation of the gate driver and/or the source driver. For example, the gate driver may drive a transistor (not shown) by applying a voltage to a plurality of gate lines. For example, the source driver may convert image data transmitted as digital values into analog values, thereby charging the pixels. The processor 120 or 430 may control each pixel to output light of a predetermined color by adjusting a transistor (e.g., a switch device) connected to each pixel (or a subpixel) included in the display. For example, the processor 120 or 430 may render image data corresponding to the active region of the display, and may transmit the image data to the display processor. The display processor may control the driving voltage for each pixel so that visual information is output to the active region of the display, based on the image data.

In operation 520, the processor 120 or 430 may accumulate and measure (or record) the display usage of the first and second display regions.

According to an embodiment, the processor 120 or 430 may accumulate and measure a usage time for which an image is displayed on the display and/or a driving time for which the display is driven for each specified active region (e.g., the first display region and the second display region, or each window region) depending on a change in the display structure. The processor 120 or 430 may continuously or periodically store the usage time and/or the driving time for each display region of the display in one area of a memory, and may update the same, thereby recording the usage time and/or the driving time for each region.

For example, the electronic device 101 may detect contraction/expansion of the display using at least one sensor (e.g., the sensor module 176 in FIG. 1). The processor may detect the state in which the first structure 201 or the display is expanded to the maximum (e.g., the open state), the state in which the first structure 201 or the display is contracted to the minimum (e.g., the closed state), and the intermediate state, and may measure the usage for the first display region and the second display region, the usage for each window region, the usage for each pixel section.

According to some embodiments, the processor 120 or 430 may identify information on burn-in of display pixels, based on information on images displayed in the first display region and the second display region, may store the burn-in information in one area of the memory, and may update the same, thereby recording the burn-in information for each region.

According to an embodiment, the processor 120 or 430 may measure the usage for each display region, based on at least one of a usage time, a driving time therefor, or burn-in information for each display region.

Additionally or complementarily, the processor 120 or 430 may measure the usage for each display region, based on at least one of an image change rate, a change in an image refresh rate, a change in operation clock of a display processor, or a change in display resolution, in addition to the usage time (or playback time), the driving time, and the burn-in information.

In operation 530, the processor 120 or 430 may calculate a difference in usage between the first display region and the second display region. In operation 540, the processor 120 or 430 may variably determine the size (or range) of the boundary compensation region and a compensation value, based on the difference in usage between the first display region and the second display region.

For example, as the difference in usage between the first display region and the second display region increases, the processor 120 or 430 may determine that the size of the boundary compensation region is to increase, based on the boundary line between the first display region and the second display region. The processor 120 or 430 may variably determine a filter compensation value for compensating for an image depending on the size of the boundary compensation region. For example, the filter compensation value may be at least one of a value for compensating for the brightness characteristic, a gamma compensation value, or a scale value for scaling the size of pixel data on an image (e.g., a pixel grayscale value) such that the degree of burn-in of the display pixels becomes uniform.

In operation 550, the processor 120 or 430 may compensate for an image displayed on the display according to the determined size of the boundary compensation region. In operation 560, the processor 120 or 430 may output the compensated image to the display.

For example, if the difference in usage between the first display region and the second display region corresponds to a first level, the processor 120 or 430 may determine the compensation region for compensating for the boundary between the first display region and the second display region to have a first size (e.g., a ratio of 0.33 of the second display region), and may compensate for the image in the determined compensation region, based on the compensation value.

As another example, if the difference in usage between the first display region and the second display region corresponds to a second level, which is greater than the first level, the processor 120 or 430 may determine the compensation region to have a second size (e.g., a ratio of 0.5 of the second display region), or if the difference in usage between the first display region and the second display region corresponds to a third level, which is greater than the second level, the processor 120 or 430 may determine the compensation region to have a third size (e.g., a ratio of 0.66 of the second display region), and may compensate for the image in the determined compensation region, based on the compensation value.

For example, the processor 120 or 430 may increase the pixel data corresponding to the display pixels having burn-in, or may reduce the pixel data corresponding to the pixels that do not have burn-in, based on the compensation value, thereby compensating for the image. Alternatively, the processor 120 or 430 may increase a driving current/voltage applied to the display pixel having burn-in by the degree of burn-in, based on the compensation value, thereby compensating for the image.

As another example, the processor 120 or 430 may compensate for an image by merging a compensation image with an original image in an overlay manner by software. For example, the processor 120 or 430 may generate compensation image data for compensating for the imbalance in display of an image, may merge the compensation image data with the original image data in an overlay manner, and may store and update final image data in the memory 440 so as to display a final image on the display. The display processor 420 may perform control such that the final image is displayed on the display 410, based on the final image data.

According to an embodiment, the processor 120 or 430 may compensate for images displayed in the first display region and the second display region, respectively, and may then further compensate for the image in the boundary compensation region.

According to an embodiment, the processor 120 or 430 may variably change the size of a window frame that separates window regions, based on the difference in usage between the first display region and the second display region, thereby compensating for the image for the boundary compensation region.

Hereinafter, various methods of compensating for an image of a display will be described in detail.

Figure 6A:
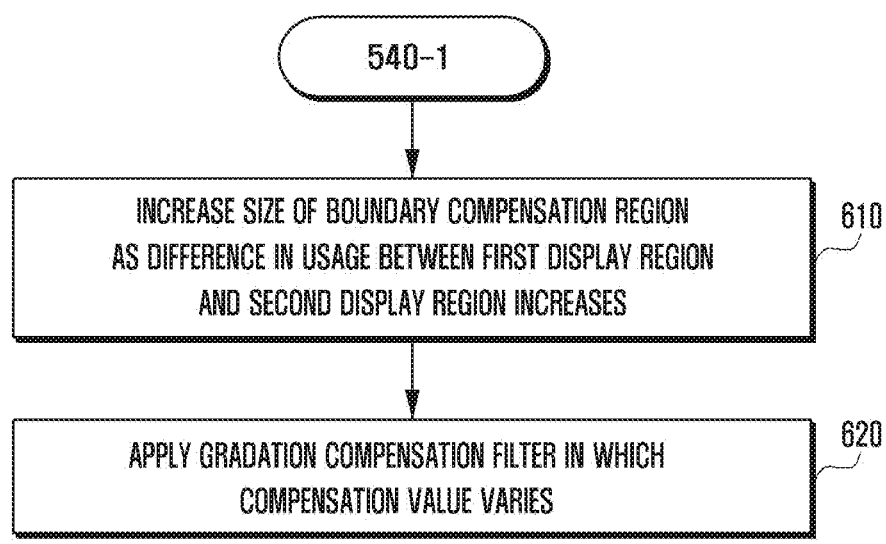
FIG. 6A illustrates a method of compensating for an image of a display described with reference FIG. 5 according to an embodiment of the disclosure.
Figure 6B:
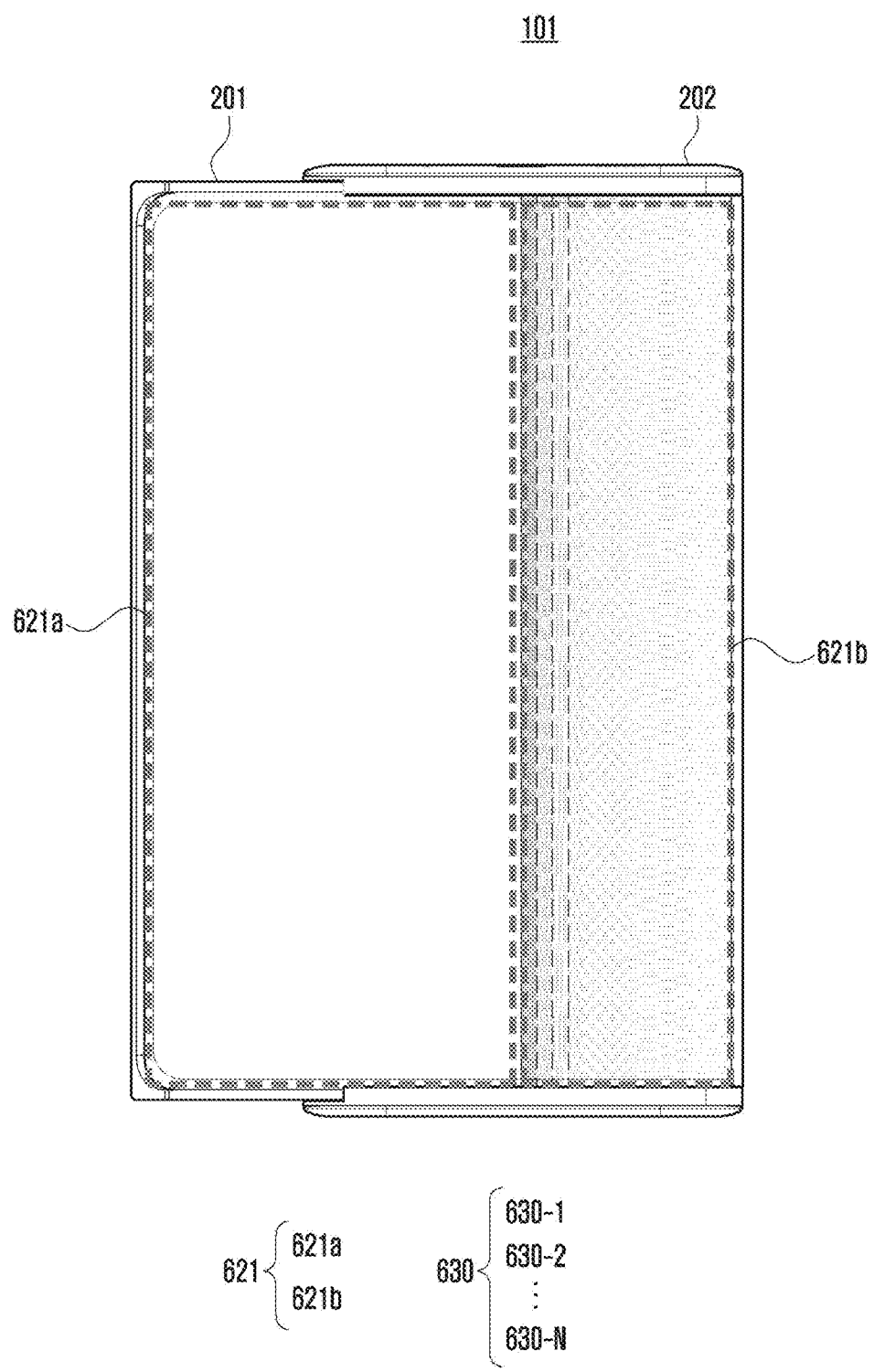
FIG. 6B illustrates a display image compensation screen to which the embodiment described with reference to FIG. 6A is applied according to an embodiment of the disclosure.

FIG. 6A illustrates a method of compensating for an image of a display described with reference FIG. 5 according to an embodiment of the disclosure, and FIG. 6B illustrates a display image compensation screen to which the embodiment described with reference to FIG. 6A is applied according to an embodiment of the disclosure.

Referring to FIGS. 6A and 6B, the electronic device 101 according to various embodiments may compensate for an image in order to minimize boundary visibility due to a difference in burn-in between pixels. As an example, 540-1 of operation 540 in FIG. 5 for image compensation, the processor 120 or 430, in operation 610, may configure a boundary compensation region 630 to increase in its size as the difference in usage between a first display region 621a (e.g., the first display region A1 in FIGS. 2A to 2C) and a second display region 621b (e.g., the second display region A2 in FIGS. 2A to 2C) increases.

For example, the electronic device 101 illustrated in FIG. 6B may be the electronic device illustrated in FIG. 2A or FIG. 2B. A display 621 of the electronic device 101 may include the first display region 621a and the second display region 612b.

When the first structure 201 of the electronic device 101 is in the open state with respect to the second structure 202 (e.g., the open state), the exposed area of the display 621 (e.g., the display 203 in FIGS. 2A to 2C) may correspond to the first display region 621a and the second display region 621b. If the difference in usage between the first display region 621a and the second display region 621b corresponds to a first level, the processor 120 or 430 may determine a first region 630-1 to be the boundary compensation region 630.

According to an embodiment, if the difference in usage between the first display region 621a and the second display region 621b corresponds to a second level, which is greater than the first level, the processor 120 or 430 may determine a second region 630-2, which is increased from the first region 630-1, to be the boundary compensation region 630. As the difference in usage between the first display region 621a and the second display region 621b increases, the boundary compensation region 630 may expand to the entire area of the second display region 621b (e.g., an $N^{th}$ region 630-N).

According to an embodiment, the processor 120 or 430 may change the size of the boundary compensation region 630 depending on a change in the difference in usage between the first display region 621a and the second display region 621b. For example, if the difference in usage between the first display region 621a and the second display region 621b is changed from the second level to the first level, the processor 120 or 430 may reduce the boundary compensation region 630. For example, the boundary compensation region 630 may be changed from the second region 630-2 to the first region 630-1.

In operation 620, the processor 120 or 430 may compensate for an image by applying a gradation compensation filter in which a compensation value gradually varies as the size of the boundary compensation region 630 changes (e.g., increases).

For example, if the difference in usage is a first level, the processor 120 or 430 may compensate for the image of the determined first region 630-1 using a first compensation value. If the difference in usage is increased to a second level, the processor 120 or 430 may compensate for the images of the determined first region 630-1 and second region 630-2 using a second compensation value. Although the first region 630-1 and the second region 630-2 are described in the example shown in the drawing, the compensation value may increase as the boundary compensation region 630 of the electronic device 101 expands to the entire area of the second display region 621b.

According to some embodiments, the electronic device 101 may compensate for the image in the boundary compensation region 630 after compensating for the images of the first display region 621a and image compensation for the second display region 621b.

According to some embodiments, the processor 120 or 430 may compensate for the images in the first region 630-1 and the second region 630-2 using substantially the same compensation value, but the disclosure is not limited thereto, and the processor 120 or 430 may compensate for the image in the boundary compensation region 630 by applying different compensation values to the first region 630-1 and the second region 630-2, respectively.

Figure 7A:
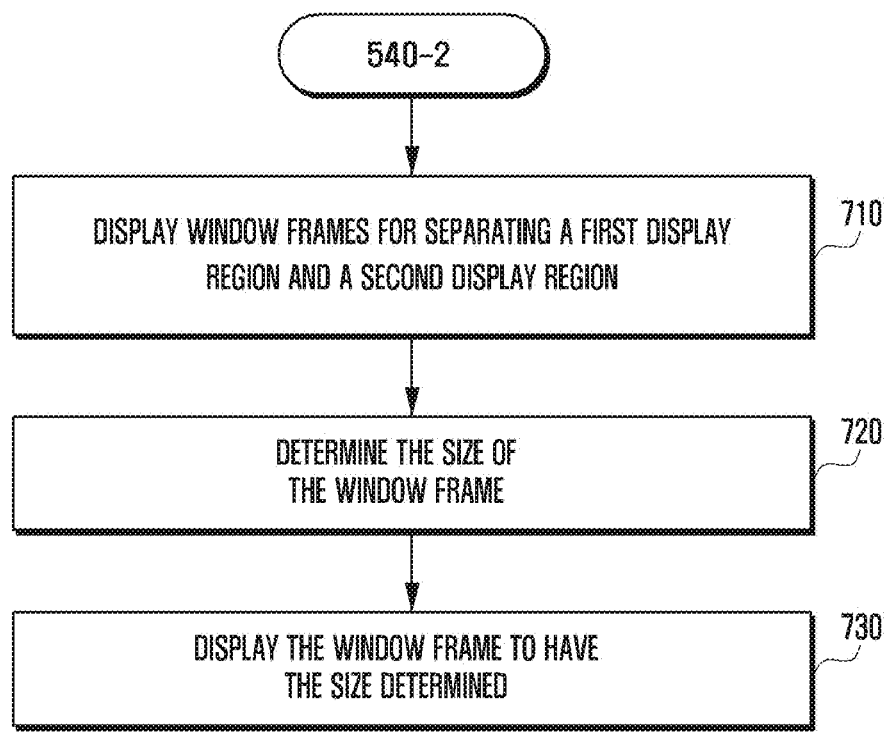
FIG. 7A illustrates another method of compensating for an image on a display described with reference to FIG. 5 according to an embodiment of the disclosure.
Figure 7B:
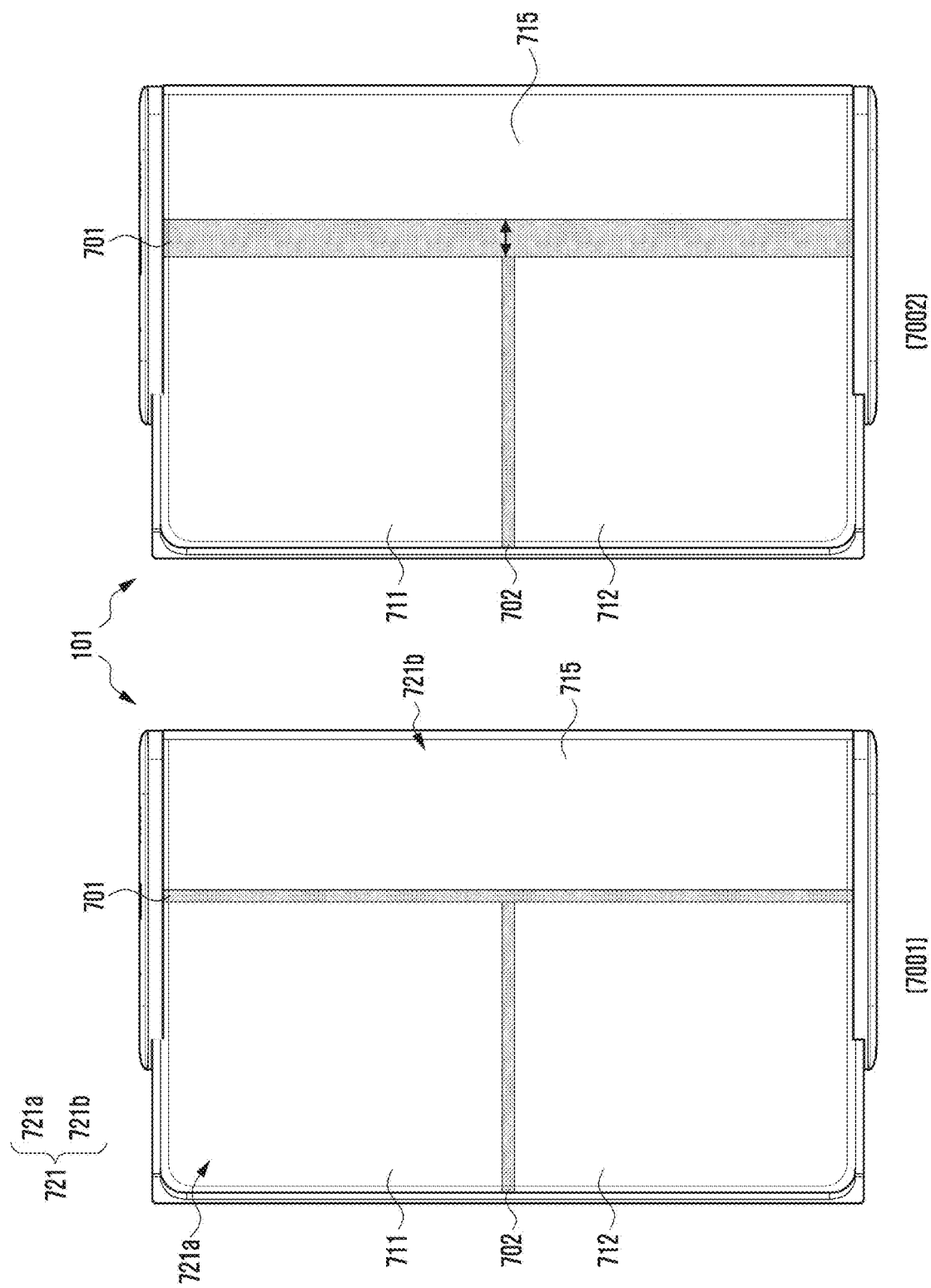
FIG. 7B illustrates a display image compensation screen to which the embodiment described with reference to FIG. 7A is applied according to an embodiment of the disclosure.

FIG. 7A illustrates another method of compensating for an image on a display described with reference to FIG. 5 according to an embodiment of the disclosure, and FIG. 7B illustrates a display image compensation screen to which the embodiment described with reference to FIG. 7A is applied according to an embodiment of the disclosure.

Referring to FIGS. 7A and 7B, according to various embodiments, the electronic device 101 may compensate for an image related to the boundary in order to minimize boundary visibility due to a difference in burn-in between pixels. As another example 540-2 of operation 540 in FIG. 5 for image compensation, in operation 710, the processor 120 or 430 may display window frames (or separators) 701 and 702 for separating a first display region 721a and a second display region 721b from each other in a display 721.

According to an embodiment, an electronic device 101 may operate in a multi-window mode in which the display 721 is divided into regions. The regions divided by the window frames 701 and 702 may be defined as window regions (or windows). The size of the window region may be adjusted (or changed) by the movement of the window frames 701 and 702.

For example, the electronic device 101 may be any one of the electronic devices shown in FIGS. 1 to 4, and, as shown in FIG. 7B, may display a first window frame 701 for separating the first display region 721a (e.g., the first display region A1 in FIGS. 2A to 2C) and the second display region 721b (e.g., the second display region A2 in FIGS. 2A to 2C) from each other and a second window frame 702 for dividing the first display region 721a into two regions on the display 721 when a user request is received and/or a function is executed. The display 721 may be divided into a first window region 711, a second window region 712, and a third window region 715, which independently output execution screens, by the first window frame 701 and the second window frame 702. Although FIG. 7B shows that the first display region 721a is divided into two window regions, the display 721 may be divided into N window regions (N is a natural number of 2 or more), which is the maximum, in proportion to the window size, and the first display region 721a and the second display region 721b may not be separated.

In operation 720, the processor 120 or 430 may variably determine the size of the window frame, based on the difference in usage between the first display region 721a and the second display region 721b. In operation 730, the processor 120 or 430 may display the window frame to have the size determined according to the difference in usage. For example, as shown in FIG. 7B, if the difference in usage is a first level, the processor 120 or 430 may display the first window frame 701 having a size shown in 7001, and if the difference in usage is changed to a second level, the processor 120 or 430 may display the first window frame 701 having an increased size as shown in 7002.

According to an embodiment, the processor 120 or 430 may reduce the size of the first window frame 701 from the size shown in 7002 to the size shown in 7001 depending on a change in the difference in usage (e.g., a change from the second level to the first level), and may display the same.

The processor 120 or 430 according to an embodiment may detect the difference in usage between display pixels according to information on the image (e.g., videos or a keypad) displayed in the first window region 711 and the second window region 712 or a change in the brightness thereof, and may change (e.g., increase or reduce) the size of the second window frame 702 to compensate for the difference in usage between the first window region 711 and the second window region 712, thereby displaying the same.

Figure 8:
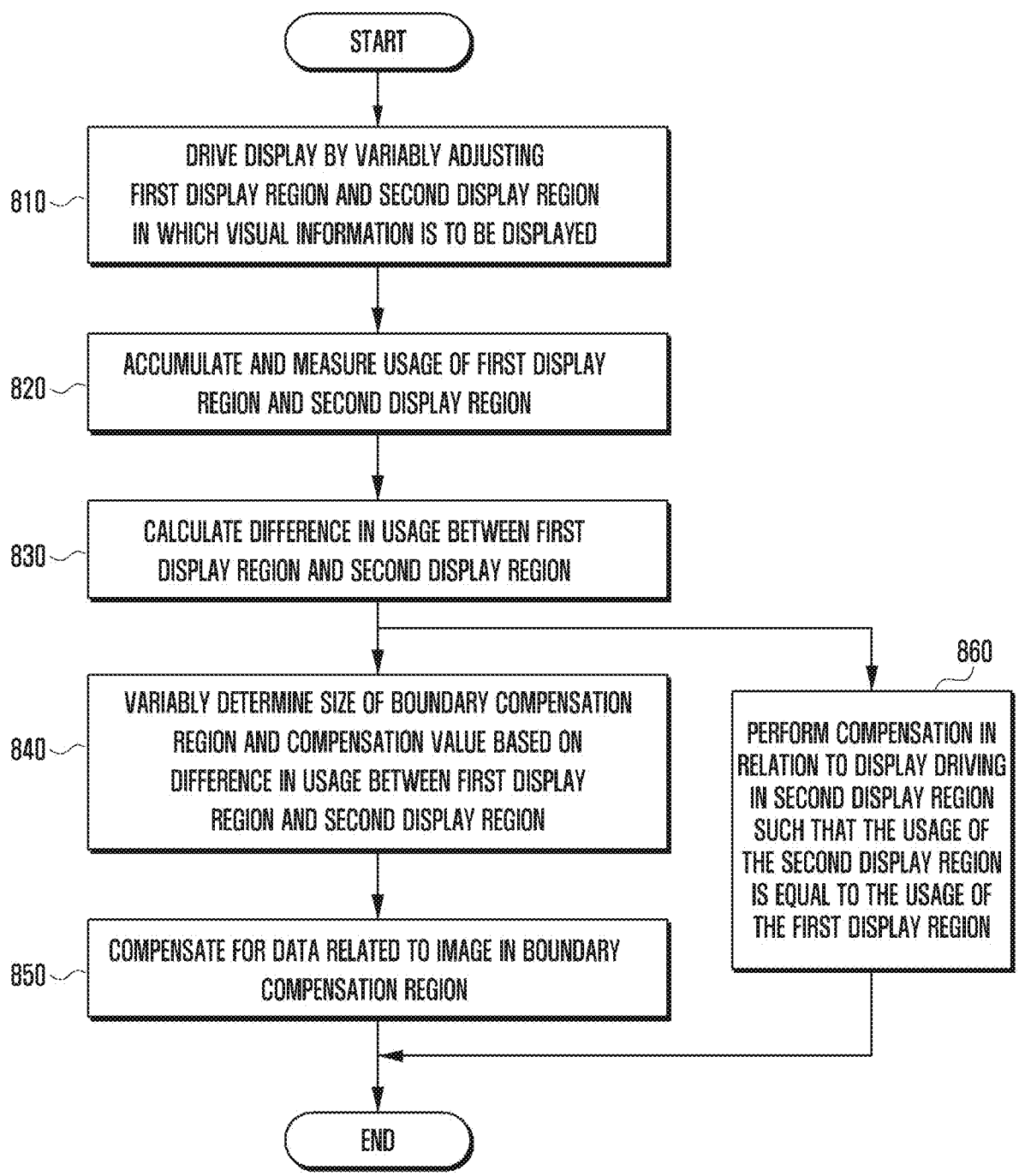
FIG. 8 illustrates a method of compensating for display burn-in in an electronic device according to an embodiment of the disclosure.

FIG. 8 illustrates a method of compensating for display burn-in in an electronic device according to an embodiment of the disclosure.

Referring to FIG. 8, in operation 810, a processor (e.g., the processor 120 in FIG. 1 or the application processor 430 in FIG. 4) of an electronic device (e.g., the electronic device 101 in FIG. 1) according to various embodiments may variably adjust a first display region and a second display region (or active regions) in which visual information is to be displayed, thereby driving a display (e.g., the display module 160 in FIG. 1 or the display 410 in FIG. 4). Since operations 810 to 850 in FIG. 8 are substantially the same as operations 510 to 550 described with reference to FIG. 5, they will be schematically described, and not described in further detail, in FIG. 8.

In operation 820, the processor 120 or 430 may accumulate and measure (or record) the display usage of the first display region and the second display region.

According to an embodiment, the processor 120 or 430 may accumulate and measure a usage time for which an image is displayed on the display and/or a driving time for which the display is driven for each specified active region (e.g., the first display region and the second display region, or each window region) according to a change in the display structure.

According to some embodiments, the processor 120 or 430 may identify information on burn-in of display pixels, based on information on the images displayed in the first display region and the second display region, may store the burn-in information in one area of the memory, and may update the same, thereby recording the burn-in information for each region.

According to an embodiment, the processor 120 or 430 may measure the usage for each display region, based on at least one of a usage time (or playback time), a driving time, or burn-in information for each display region.

Additionally or complementarily, the processor 120 or 430 may measure the usage for each display region, based on at least one of an image change rate, a change in an image refresh rate, a change in operation clock of a display processor, or a change in display resolution. In operation 830, the processor 120 or 430 may calculate the difference in usage between the first display region and the second display region. In operation 840, the processor 120 or 430 may variably determine the size (or range) of a boundary compensation region and a compensation value, based on the difference in usage between the first display region and the second display region.

For example, as the difference in usage between the first display region and the second display region increases, the processor 120 or 430 may determine that the size of the boundary compensation region is to be increased, based on the boundary line between the first display region and the second display region.

As another example, the processor 120 or 430 may compensate for the image for the boundary compensation region by variably changing the size of a window frame for separating window regions, based on the difference in usage between the first display region and the second display region.

In operation 850, the processor 120 or 430 may compensate for the image displayed on the display according to the determined size of the boundary compensation region.

In operation 860, independently or in parallel, the processor 120 or 430 may perform compensation in relation to display driving such that the usage of the first display region is equal to the usage of the second display region in order to reduce the difference in the display burn-in level according to the difference in usage.

According to an embodiment, the processor 120 or 430 may determine the region having higher usage, among the first display region and the second display region, based on the difference in usage, may reduce the brightness of the region having higher usage below a predetermined value, and may increase the brightness of a region having lower usage above a predetermined value, thereby compensating for display driving.

According to an embodiment, when an application is executed, the processor 120 or 430 may identify window regions for an image according to the execution of the application, may dispose a window region for displaying visual information with lower brightness in the region having higher usage, and may dispose a window region for displaying visual information with higher brightness in the region having lower usage, among the first display region and the second display region, thereby compensating for display driving.

According to some embodiments, based on the screen information of an application in a multi-application environment (e.g., multitasking), the processor 120 or 430 may perform control such that the region having higher usage, among the first display region and the second display region, displays an application having screen information of lower brightness and such that the region having higher usage displays an application having screen information of lower brightness, thereby compensating for display driving.

According to an embodiment, if the second display region is in an inactive state, the processor 120 or 430 may compensate for the second display region by forcibly driving the same such that the usage of the first display region is equal to the usage of the second display region.

According to an embodiment, the processor 120 or 430 may compensate for display driving of the boundary compensation region by variably changing the position of a boundary line between the first display region and the second display region. Hereinafter, various methods for compensating for display driving will be described in detail.

Figure 9A:
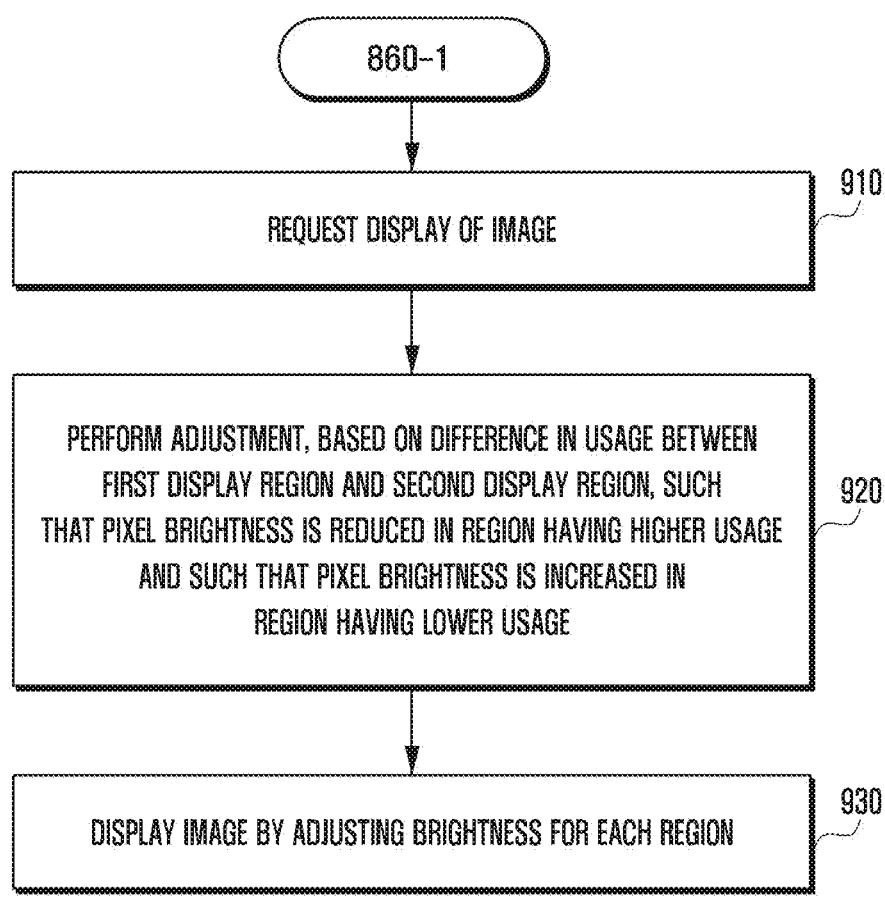
FIG. 9A illustrates a method for compensating for display driving described with reference to FIG. 8 according to an embodiment of the disclosure.
Figure 9B:
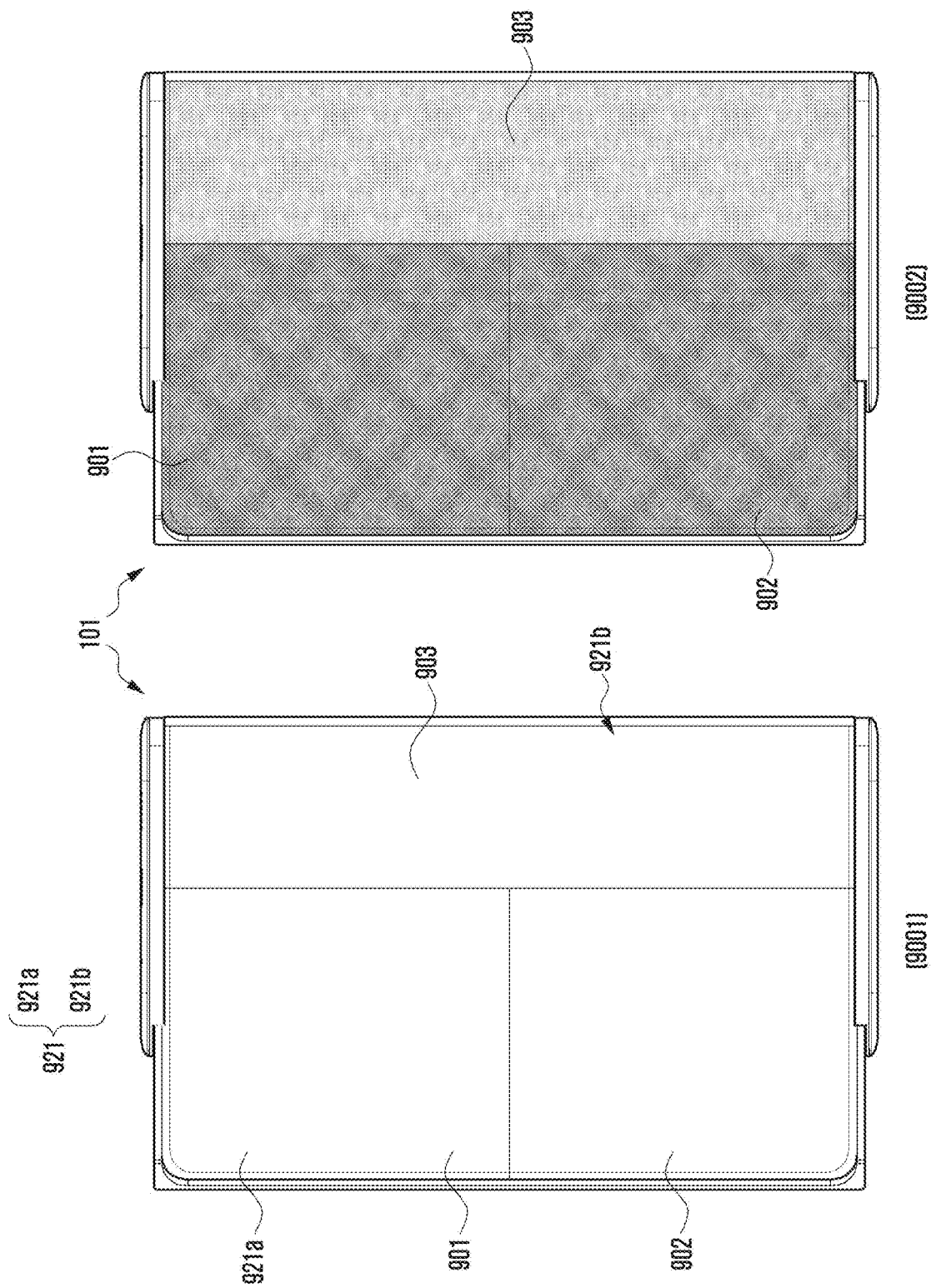
FIG. 9B illustrates a display driving compensation screen to which the embodiment described with reference to FIG. 9A is applied according to an embodiment of the disclosure.

FIG. 9A illustrates a method for compensating for display driving described with reference to FIG. 8 according to an embodiment of the disclosure, and FIG. 9B illustrates a display driving compensation screen to which the embodiment described with reference to FIG. 9A is applied according to an embodiment of the disclosure.

Referring to FIGS. 9A and 9B, the electronic device 101 according to various embodiments may compensate for (or accelerate) driving for each display region in order to minimize the difference in burn-in between pixels. The electronic device 101 may accelerate a display panel in a relatively low-usage region by applying different brightness to respective regions, thereby compensating the same such that the burn-in level of a display panel in the relatively low-usage region is equal to the burn-in level of a display panel in a high-usage region. As an additional example 860-1 of operation 860 for compensating for display driving described with reference to FIG. 8, the processor 120 or 430 may detect an event for requesting display of an image in operation 910. For example, the processor may start an operation process for displaying visual information on a display 921 in response to a request for executing an app/function. The processor 120 or 430 may generate image data to be displayed on the display 921.

In operation 920, the processor 120 or 430 may perform adjustment, based on the difference in usage between the first display region and the second display region, such that the brightness of the pixel is reduced in the region having higher usage and such that the brightness of the pixel is increased in the region having lower usage. In operation 930, the processor 120 or 430 may display an image by adjusting the brightness for each region.

For example, the electronic device 101 illustrated in FIG. 9B may be any one of the electronic devices illustrated in FIGS. 1 to 4, and the electronic device 101 may display an image in a multi-window mode on the display 921 including a first display region 921a and a second display region 921b. As shown in 9001, the processor 120 or 430 may separate a first window region 901, a second window region 902, and a third window region 903 from each other, and may control display driving for respective regions. The processor 120 or 430 may calculate the difference in usage between the regions. For example, the electronic device 101 may have a record stating that an image was displayed for a first time (e.g., 100 hours) in a first display region 921a, which is divided into a first window region 901 and a second window region 902, and that an image was displayed for a second time (e.g., 70 hours), which is less than the first time, in the second display region 921b. The processor 120 or 430 may determine the first display region 921a to be the region having higher usage and the second display region 921b to be the region having lower usage.

Additionally or complementarily, the processor 120 or 430 may measure the usage for each display region, based on at least one of an image change rate, a change in an image refresh rate, a change in operation clock of a display processor, or a change in display resolution, in addition to the usage time (or playback time), the driving time, and the burn-in information. For example, processor 120 or 430 may determine that driving of the display increases when displaying a video rather than a still image, when using a higher image refresh rate (e.g., 120 Hertz (Hz)) than a lower image refresh rate (e.g., 60 Hz), and/or when the operation clock of the display processor increases, and may measure the usage for each display region, based thereon. As shown in 9002, the processor 120 or 430 may perform adjustment such that the pixel brightness is reduced in the first window region 901 and the second window region 902 included in the first display region 921a having higher usage and such that the pixel brightness is increased in the third window region 903 included in the second display region 921b having lower usage.

For example, in the case where the first display region 921a displays an image for 100 hours, thereby bringing about burn-in of 20% in the display pixels thereof, whereas the second display region 921b displays an image for 70 hours, thereby bringing about burn-in of 10% in the display pixels thereof, the processor may reduce the pixel brightness by a first compensation value (e.g., 100/80) in the first display region, and may increase the pixel brightness by a second compensation value (e.g., 100/90) in the second display region. Under the control of the processor, the display processor may supply a current or a voltage equal to the increased pixel data to the display pixels, thereby adjusting the brightness of each pixel.

Figure 10A:
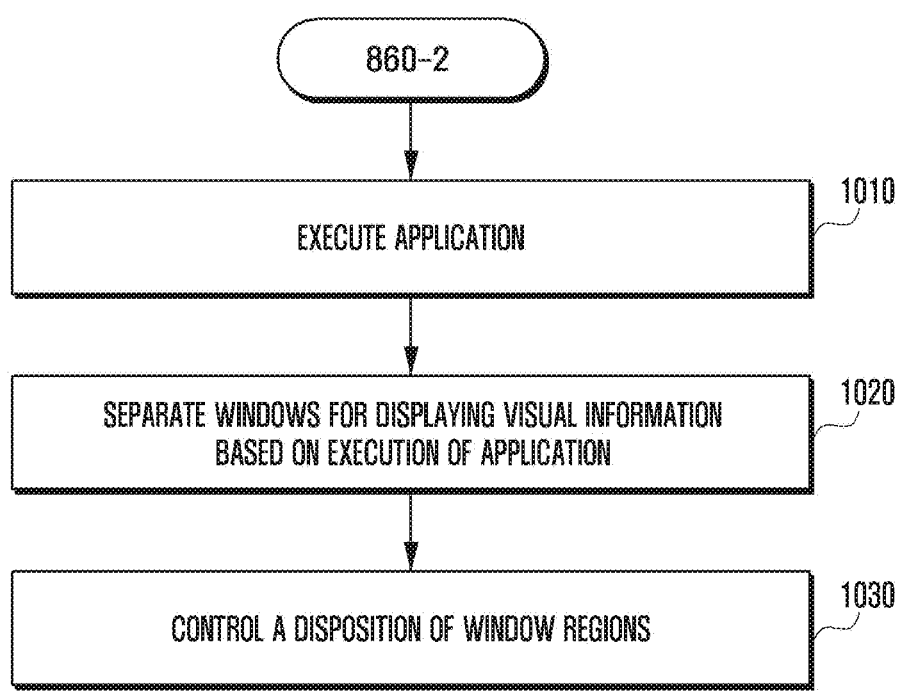
FIG. 10A illustrates another method for compensating for display driving described with reference to FIG. 8 according to an embodiment of the disclosure.
Figure 10B:
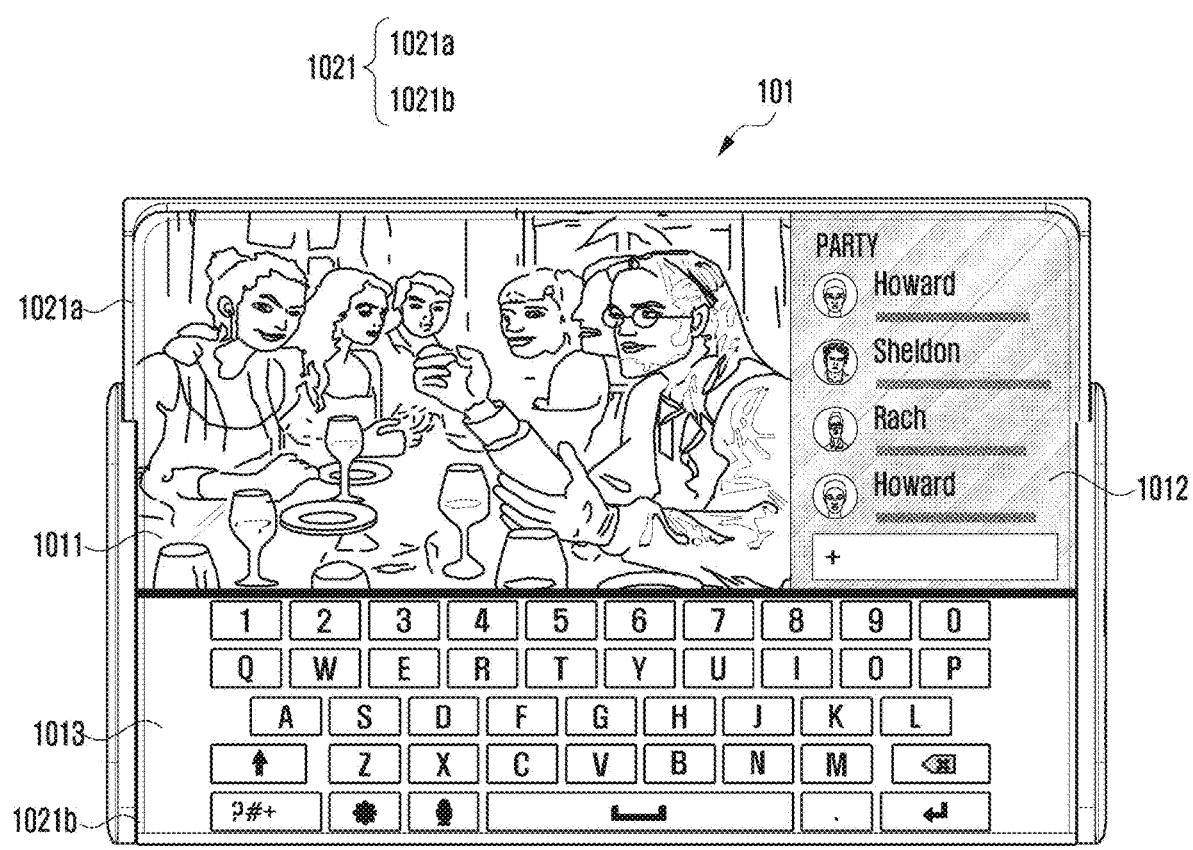
FIG. 10B illustrates a display driving compensation screen to which the embodiment described with reference to FIG. 10A is applied according to an embodiment of the disclosure.

FIG. 10A illustrates another method for compensating for display driving described with reference to FIG. 8 according to an embodiment of the disclosure, and FIG. 10B illustrates a display driving compensation screen to which the embodiment described with reference to FIG. 10A is applied according to an embodiment of the disclosure.

Referring to FIGS. 10A and 10B, the electronic device 101 according to various embodiments may compensate for (or accelerate) driving for each display region in order to minimize the difference in burn-in between pixels. The electronic device 101 may accelerate a display panel in a region having lower usage by variably disposing the positions of the divided window regions depending on the usage for each region, thereby performing compensation such that the burn-in level of a display panel in the region having lower usage is equal to the burn-in level of a display panel in the region having higher usage.

As an additional example 860-2 of operation 860 for compensating for display driving described with reference to FIG. 8, the processor 120 or 430 may detect a request for execution of an application in operation 1010. The processor 120 or 430 may detect selection for an icon related to an application by a user, and may start an application execution process in response to the selection of the icon. The processor 120 or 430 may generate image data to be displayed on the display in response to the execution of the application. The processor 120 or 430 may operate in a multi-application environment or a multi-window mode.

In operation 1020, the processor 120 or 430 may divide windows for displaying visual information, based on the execution of the application. In operation 1030, the processor 120 or 430 may perform control so as to dispose a window region for displaying visual information with higher brightness in a region having lower display usage and dispose a window region for displaying visual information with lower brightness in a region having higher display usage.

For example, the electronic device 101 illustrated in FIG. 10B may be any one of the electronic devices illustrated in FIGS. 1 to 4, and the electronic device 101 may operate in a multi-window mode. When operating in the multi-window mode, the processor 120 or 430 may identify the characteristics of image data to be displayed in each window region in relation to the executed application, and may identify an image (or an app screen) having lower brightness and an image (or an app screen) having higher brightness. As shown in FIG. 10B, the processor 120 or 430 may adjust positions in a display 1021 such that, for example, a first window region 1011 and a second window region 1012 are disposed in a first display region 1021a having higher usage and such that a third window region 1013 is disposed in a second display region 1021b having lower usage.

According to an embodiment, the processor 120 or 430 may adjust positions such that the region having higher usage, among the first display region and the second display region, displays an application having screen information of higher brightness and such that the region having lower usage displays an application having screen information of lower brightness, based on the screen information of the application in a multi-application environment (e.g., multi-tasking).

According to some embodiments, the processor 120 or 430 may analyze a user input occurrence pattern, thereby identifying a region receiving more inputs and a region receiving fewer inputs in the display, and may adjust the disposition of the app screen or the window region depending on the characteristics of the app or whether an input occurs. The processor 120 or 430 may adjust the pixel brightness to be increased in a region in which an app or window region (e.g., an input panel (SIP) or a scroll region) that requires user input is disposed, and may adjust the pixel brightness to be reduced in a region in which an app or window region (e.g., display of an image) that does not require user input is disposed, thereby compensating for display driving.

Figure 11A:
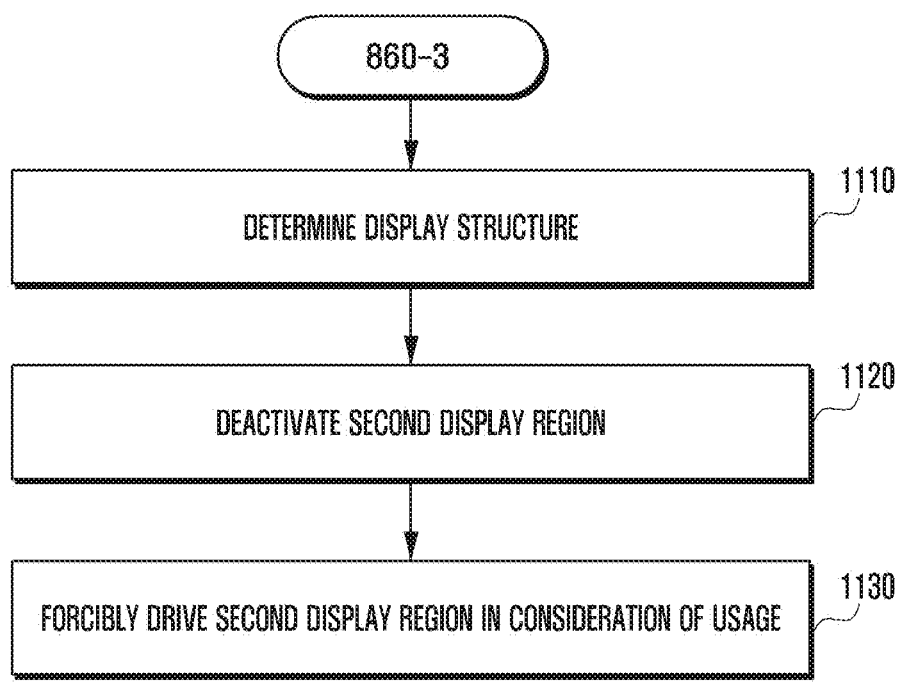
FIG. 11A illustrates another method for compensating for display driving described with reference to FIG. 8 according to an embodiment of the disclosure.
Figure 11B:
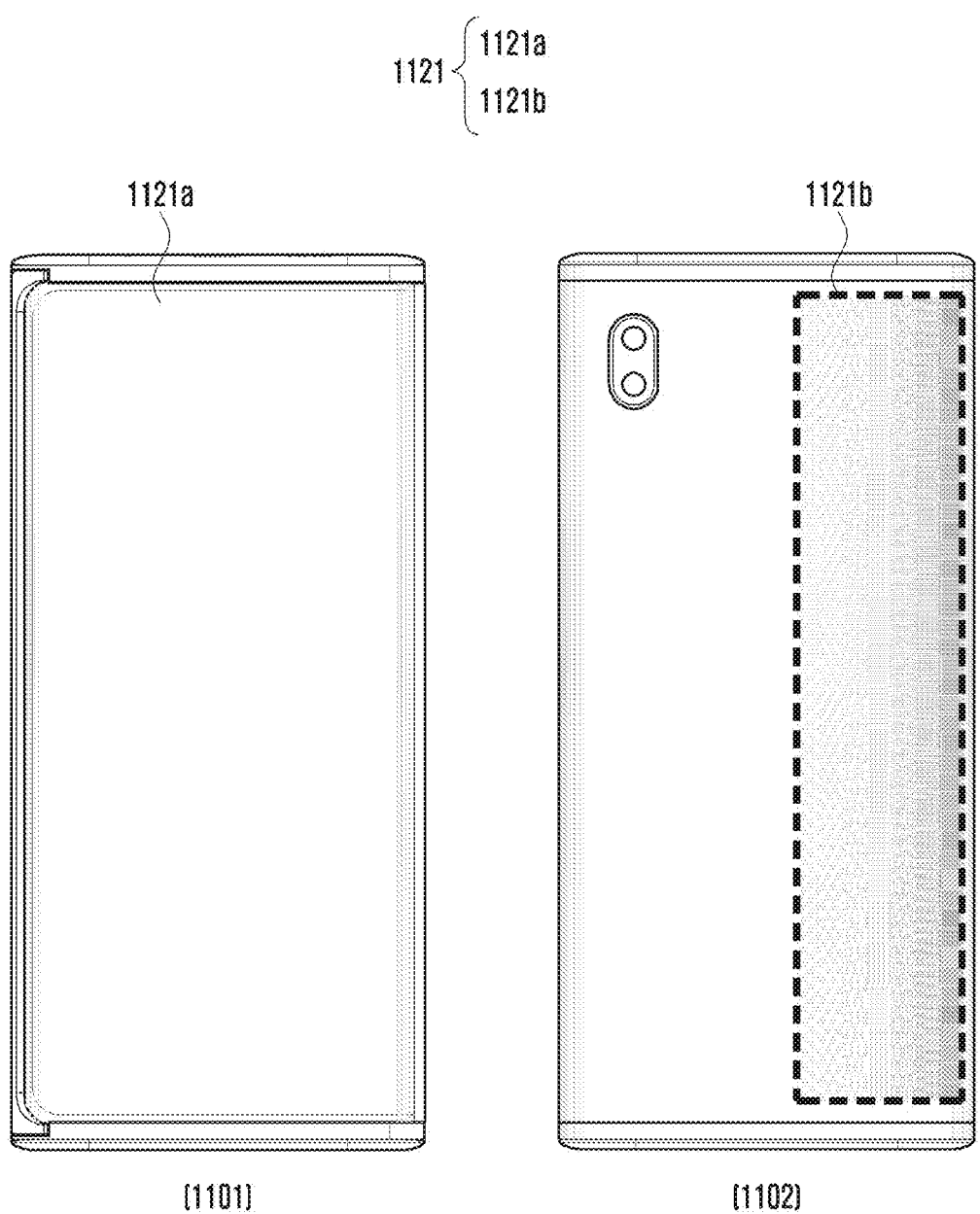
FIG. 11B illustrates a display burn-in compensation screen to which the embodiment described with reference to FIG. 11A is applied according to an embodiment of the disclosure.

FIG. 11A illustrates another method for compensating for display driving described with reference to FIG. 8 according to an embodiment of the disclosure, and FIG. 11B illustrates a display burn-in compensation screen to which the embodiment described with reference to FIG. 11A is applied according to an embodiment of the disclosure.

Referring to FIGS. 11A and 11B, in order to minimize a difference in burn-in between pixels, the electronic device 101 according to various embodiments may forcibly drive a region having lower usage, and may compensate for the same such that the burn-in level of a display panel therein is equal to the burn-in level of a display panel in a region having higher usage. As an additional example 860-3 of operation 860 for compensating for display driving described with reference to FIG. 8, the processor 120 or 430 may determine the display structure in operation 1110. For example, the processor 120 or 430 may detect contraction/expansion of the display using sensor information. The processor 120 or 430 may determine the state in which the display is expanded to the maximum (or an open state), the state in which the display is contracted to the minimum (or a closed state), and an intermediate state.

In operation 1120, the processor 120 or 430 may identify an inactive region among display regions. In operation 1130, the processor 120 or 430 may forcibly drive the inactive region, and may compensate for display driving so as to match the display usage of the region in which the difference in usage occurs in consideration of the usage of the inactive region.

For example, the electronic device 101 illustrated in FIG. 11B may be any one of the electronic devices illustrated in FIGS. 1 to 4, and, for example, when the first structure 201 is in a closed state 1101 or 1102 with respect to the second structure 202, the electronic device 101 (e.g., the processor 120 or 430) may designate a first display region 1121a of a display 1121 as an active region, and may designate a second display region 1121b thereof as an inactive region. The first display region 1121a may have higher usage than the second display region 1121b, and the second display region 1121b may have lower usage because the second display region 1121b is deactivated in the closed state 1101 or 1102.

In the case where the second display region 1121b is accommodated, the processor 120 or 430 may forcibly drive the second display region 1121b in order to even the burn-in level due to the difference in usage between the first display region 1121a and the second display region 1121b.

For example, the processor 120 or 430 may perform control so as to forcibly drive the second display region 1121b in response to a condition in which a charging event is detected in the electronic device 101 in the closed state. In the closed state, since the second display region 1121b is blocked by the second structure or a housing and is not viewed by a user, the user may not be able to recognize the forcible operation on the second display region 1121b.

According to an embodiment, the processor 120 or 430 may apply a driving current/voltage to the display pixels of the second display region 1121b in the closed state, and may variably change a forcible driving time and the degree of supply of the driving current/voltage depending on the size of a boundary compensation region and a compensation value according to the difference in usage. For example, the processor 120 or 430 may perform a forcible operation of the display, based on time information, in the state/mode in which the user does not use the electronic device 101 (e.g., a sleep mode or a charging mode).

Figure 12:
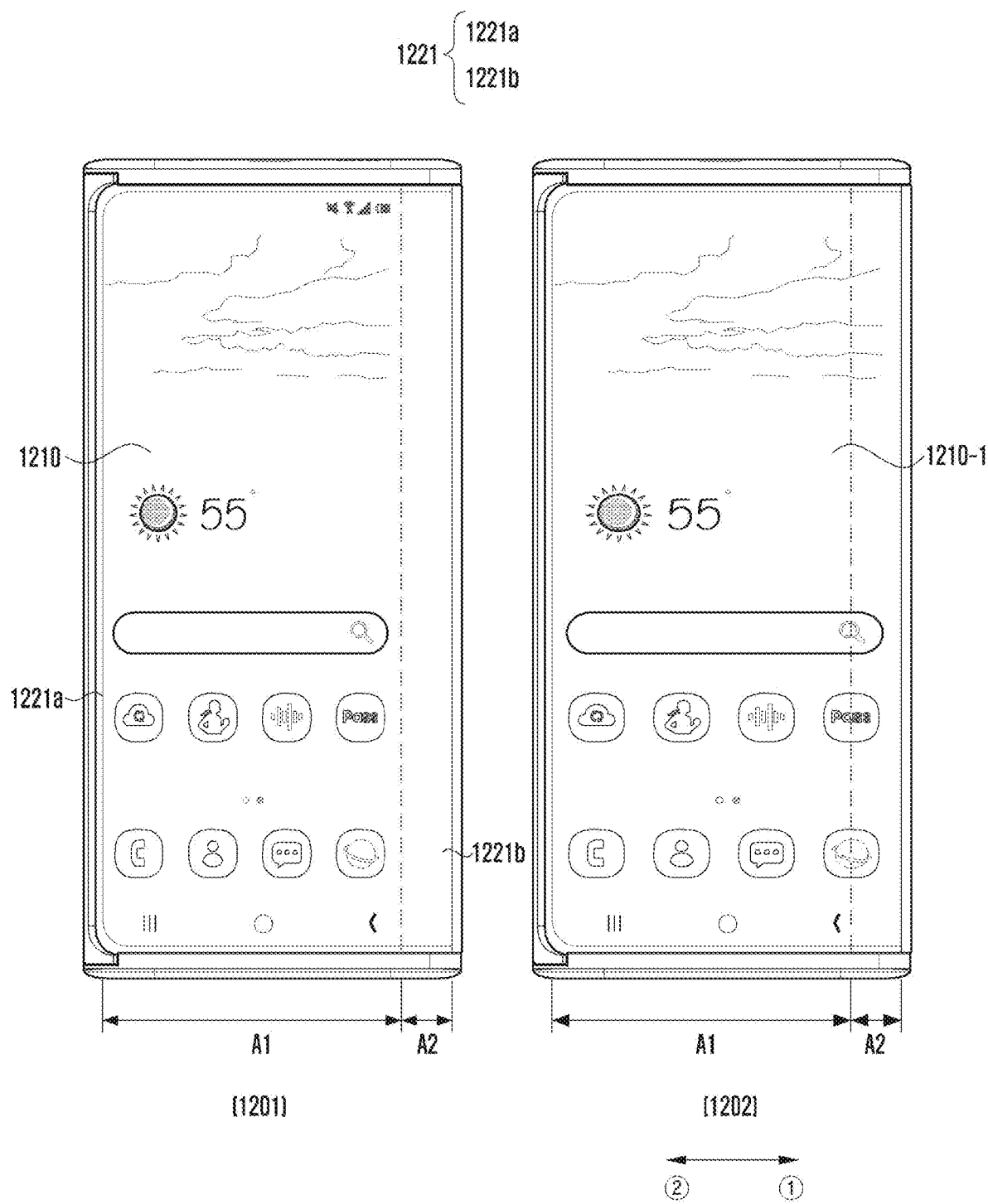
FIG. 12 illustrates a display burn-in compensation screen according to an embodiment of the disclosure.

FIG. 12 illustrates a display burn-in compensation screen according to an embodiment of the disclosure.

Referring to FIG. 12, according to an embodiment, the electronic device 101 may variably change the position of the boundary line between a first display region 1221a and a second display region 1221b on a display 1221 for operation in order to compensate for the boundary. As the difference in usage between the first display region 1221a and the second display region 1221b increases, the electronic device 101 may expand the size of the first display region in the direction toward the second display region (e.g., in the direction ①), thereby operating the expanded first display region as a main display.

For example, as shown in 1201, in the closed state, the electronic device 101 may display a graphic user interface 1210 such as a home screen by driving the first display region 1221a having a size A1 as a main display. As the electronic device 101 is used, the difference in usage of the display occurs between the first display region 1221a and the second display region 1221b. As the difference in usage increases, the electronic device may expand the size of the main display into region A2 as shown in 1202, and may render image data to conform to the expanded size, thereby displaying a graphic user interface 1210-1.

For example, the electronic device 101 may display a graphic user interface conforming to an aspect ratio, based on a display ratio, width and height, or dots per inch (DPI) of visual information to be displayed in a region where visual information is to be displayed. The electronic device 101 may perform driving by expanding the boundary line of the first display region 1221a, which is used as a main display, to the second display region 1221b, thereby compensating for or accelerating the driving of display pixels located in the boundary compensation region.

According to some embodiments, as the difference in usage increases in the closed state, the electronic device 101 may reduce the size of the first display region in the direction toward the first display region (e.g., in the direction ②), and may operate the reduced first display region as a main display. For example, in the closed state, as shown in 1202, the electronic device 101 may drive a first display region having a size A1+A2 (e.g., the first display region 1121a in FIG. 11B) as a main display, thereby displaying a graphic user interface 1210-1 such as a home screen. As the electronic device 101 is used, the difference in usage of the display occurs between the first display region (e.g., the first display region 1121a in FIG. 11B) and the second display region (e.g., the second display region 1121b in FIG. 11B). As the difference in usage increases, the electronic device may reduce the size of the main display to the region A1 as shown in 1201, and may render image data to conform to the reduced size, thereby displaying the graphic user interface 1210.

A method of compensating for burn-in of a display in the electronic device 101 according to various embodiments may include an operation of driving the display by variably adjusting a first display region and a second display region in which visual information is to be displayed on the display, based on an operation state or a display structure state of the electronic device 101, an operation of calculating a difference in usage of the display between the first display region and the second display region, an operation of variably determining the size of a boundary compensation region between the first display region and the second display region, based on the difference in usage, and an operation of variably compensating for an image according to the determined size of the boundary compensation region.

According to an embodiment, the method of compensating for burn-in of a display in the electronic device 101 may further include an operation of compensating for display driving of a region having lower usage such that a burn-in level of the region having lower usage is equal to a burn-in level of a region having higher usage, among the first display region and the second display region, after the operation of variably determining the size of the boundary compensation region.

According to an embodiment, the operation of compensating for the display driving may include at least one of an operation of variably changing the size of at least one window frame located in the boundary compensation region in proportion to the difference in usage between the first display region and the second display region, an operation of determining a region having higher usage, among the first display region and the second display region, adjusting the brightness of the region having higher usage to be lower than a predetermined value, and adjusting the brightness of a region having lower usage to be higher than a predetermined value, an operation of identifying window regions dividing the display if a plurality of applications is executed, and based on image data to be displayed on the display, performing adjustment so as to dispose a first window region or a first application for displaying the visual information with higher brightness in a region having higher usage and dispose a second window region or a second application for displaying the visual information with lower brightness in a region having lower usage, among the first display region and the second display region, or an operation of forcibly driving the second display region, if the second display region is in an inactive state, such that the usage of the first display region is equal to the usage of the second display region.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. An electronic device comprising:
   a display including a first display region, a second display region and a boundary display region, wherein the first display region is not allowed to be slid into the electronic device, the second display region is allowed to be slid into the electronic device and the boundary display region is disposed between the first display region and the second display region;
   a memory; and
   at least one processor, wherein the at least one processor is configured to:
      determine the boundary display region, based on a difference in usage of the display between the first display region and the second display region, and
      control the display to display an image, compensated, in the determined boundary display region based on image data for compensating an image corresponding to the determined boundary display region,
   wherein the boundary display region is variably determined based on a portion of the second display region variably exposed to outside of the electronic device for displaying visual information.

2. The electronic device of claim 1, further comprising:
   a first structure; and
   a second structure configured to enable a reciprocating movement of the first structure relative to the second structure,
   wherein the display is a flexible display and the first display region is disposed in the first structure,
   wherein the second display region extends from the first display region and is configured to be at least partially accommodated in the second structure or exposed to an outside of the second structure according to the reciprocating movement of the first structure, and
   wherein the at least one processor is further configured to:
      drive the display of the second display region, based on a state in which the second display region is exposed to the outside of the second structure, and
      not drive the display of the second display region, based on a state in which the second display region is accommodated in the second structure.

3. The electronic device of claim 2, wherein the at least one processor is further configured to increase the boundary display region from a first size to a second size in proportion to the difference in usage between the first display region and the second display region.

4. The electronic device of claim 3, wherein the at least one processor is further configured to apply a gradation compensation filter in which an image data value of the boundary display region varies depending on the difference in usage.

5. The electronic device of claim 4, wherein the at least one processor is further configured to adjust image data displayed in the first display region and image data displayed in the second display region independently of the image data value of the boundary display region or in addition thereto.

6. The electronic device of claim 1, wherein the boundary display region comprises a window frame for separating the first display region and the second display region or for separating app execution window regions on the display in a multi-window mode or a multi-application environment.

7. The electronic device of claim 1, wherein the at least one processor is further configured to:
   adjust display driving of a first region having lower usage such that a burn-in level of the first region having lower usage is equal to a burn-in level of a second region having higher usage, among the first display region and the second display region.

8. The electronic device of claim 7, wherein the at least one processor is further configured to:
   determine the second region having higher usage, among the first display region and the second display region,
   adjust a brightness of the second region having the higher usage to be lower than a predetermined value, and
   adjust a brightness of the first region having lower usage to be higher than a predetermined value, thereby compensating for the display driving.

9. The electronic device of claim 7, wherein the at least one processor is further configured to:
   identify window regions dividing the display if a plurality of applications are executed, and
   based on image data to be displayed on the display:
      dispose a first window region or a first application for displaying visual information with a lower brightness in the second region having higher usage among the first display region and the second display region, and
      dispose a second window region or a second application for displaying the visual information with a higher brightness in the first region having lower usage thereof, thereby compensating for the display driving.

10. The electronic device of claim 7, wherein the at least one processor is further configured to forcibly drive the second display region if the second display region is in an inactive state, thereby compensating for the display driving such that the usage of the first display region is equal to the usage of the second display region.

11. The electronic device of claim 10, wherein the at least one processor is further configured to:
   increase the usage of the second display region by applying a gradient compensation filter in which a brightness value or a usage value gradually increases in a direction toward the second display region during the forcible driving of the second display region.

12. The electronic device of claim 10, wherein the at least one processor is further configured to forcibly drive the second display region while charging the electronic device.

13. The electronic device of claim 7, wherein the at least one processor is further configured to adjust display driving in the boundary display region by variably changing a position of a boundary line between the first display region and the second display region.

14. A method of compensating for burn-in of a display in an electronic device, the method comprising:
 driving the display by variably adjusting a size of an active region of a first display region and a second display region in which visual information is to be displayed on the display, based on an operation state or a display structure state of the electronic device;
 determining a boundary display region, based on a difference in usage of the display between the first display region and the second display region, and
 controlling the display to display an image compensated in the determined boundary display region based on image data for compensating an image corresponding to the determined boundary display region,
 wherein the boundary display region is variably determined based on a portion of the second display region variably exposed to outside of the electronic device for displaying visual information.

15. The method of claim 14, further comprising adjusting display driving of a first region having higher usage such that a burn-in level of a second region having lower usage is equal to a burn-in level of the second region having higher usage, among the first display region and the second display region, after adjusting an image of the boundary compensation region.

16. The method of claim 15, wherein the boundary display region comprise a window frame for separating the first display region and the second display region or for separating app execution window regions on the display in a multi-window mode or a multi-application environment.

17. The method of claim 14, further comprising:
 driving the display of the second display region, based on a state in which the second display region is exposed to an outside of the electronic device; and
 not driving the display of the second display region, based on a state in which the second display region is accommodated inside of the electronic device.

18. The method of claim 17, further comprising:
 increasing the boundary display region from a first size to a second size in proportion to the difference in usage between the first display region and the second display region; and applying a gradation compensation filter in which a compensation value of the boundary display region varies depending on the difference in usage.

19. The method of claim 17, wherein the boundary display region is disposed between the first display region and the second display region and includes at least parts of the first display region and second display regions.

* * * * *